(12) United States Patent
Colgate et al.

(10) Patent No.: US 9,733,746 B2
(45) Date of Patent: Aug. 15, 2017

(54) TOUCH INTERFACE DEVICE HAVING AN ELECTROSTATIC MULTITOUCH SURFACE AND METHOD FOR CONTROLLING THE DEVICE

(75) Inventors: J. Edward Colgate, Evanston, IL (US); Michael A. Peshkin, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 360 days.

(21) Appl. No.: 13/468,818

(22) Filed: May 10, 2012

(65) Prior Publication Data

US 2012/0287068 A1    Nov. 15, 2012

Related U.S. Application Data

(60) Provisional application No. 61/484,544, filed on May 10, 2011, provisional application No. 61/484,564, filed on May 10, 2011.

(51) Int. Cl.
*G06F 3/041* (2006.01)
*G06F 3/01* (2006.01)
(Continued)

(52) U.S. Cl.
CPC ............ *G06F 3/0414* (2013.01); *G06F 3/016* (2013.01); *G06F 3/041* (2013.01); *G06F 3/044* (2013.01);
(Continued)

(58) Field of Classification Search
CPC .......... G06F 3/044; G06F 3/041; G06F 3/016; G06F 3/03543; G06F 3/0488; G08G 6/00; A61N 1/36
(Continued)

(56) References Cited

U.S. PATENT DOCUMENTS 6,337,678 B1    1/2002 Fish
6,351,054 B1    2/2002 Cabuz et al.
(Continued)

FOREIGN PATENT DOCUMENTS

KR    10-2010-0065640 A    6/2010
WO    WO 2008/093965    8/2008
(Continued)

OTHER PUBLICATIONS

Chubb et al.; "ShiverPad: A Device Capable of Controlling Shear Force on a Bare Finger"; *Third Joint Eurohaptics Conference and Symposium on Haptic Interfaces for Virtual Environment and Teleoperator Systems*; Mar. 18-20, 2009; pp. 18-23.
(Continued)

*Primary Examiner* — Calvin C Ma
(74) *Attorney, Agent, or Firm* — Vedder Price P.C.

(57) ABSTRACT

A touch interface device includes a touch surface, a first electrode, and a second electrode. The first electrode is coupled with the touch surface. The first electrode also configured to receive a first haptic actuation electric potential. The second electrode is coupled with the touch surface. The second electrode also is configured to receive a different, second haptic actuation electric potential having an opposite polarity than the first haptic actuation potential. The first and second electrodes generate an electrostatic force that is imparted on one or more appendages of an operator that touches the touch surface above both the first electrode and the second electrode in order to generate a haptic effect.

39 Claims, 20 Drawing Sheets

(51) Int. Cl.
*G06F 3/044* (2006.01)
*G06F 3/045* (2006.01)
*G06F 3/046* (2006.01)

(52) U.S. Cl.
CPC .............. *G06F 3/045* (2013.01); *G06F 3/046* (2013.01); *G06F 3/0412* (2013.01); *G06F 3/0416* (2013.01); *G06F 2203/04101* (2013.01); *G06F 2203/04105* (2013.01); *G06F 2203/04112* (2013.01); *G06F 2203/04113* (2013.01)

(58) Field of Classification Search
USPC ................... 345/173, 174; 340/407.2; 607/2
See application file for complete search history.

(56) References Cited

U.S. PATENT DOCUMENTS

| | | | |
|---|---|---|---|
| 6,429,846 | B2 | 8/2002 | Rosenberg et al. |
| 6,970,160 | B2 | 11/2005 | Mulligan et al. |
| 7,148,875 | B2 | 12/2006 | Rosenberg et al. |
| 7,271,707 | B2 | 9/2007 | Gonzales |
| 9,639,158 | B2 * | 5/2017 | Levesque ............... G06F 3/016 |
| 2003/0038776 | A1 | 2/2003 | Rosenberg et al. |
| 2003/0151597 | A1 | 8/2003 | Roberts et al. |
| 2003/0179190 | A1 | 9/2003 | Franzen |
| 2005/0173231 | A1 | 8/2005 | Gonzales |
| 2006/0209037 | A1 | 9/2006 | Wang et al. |
| 2006/0279548 | A1 | 12/2006 | Geaghan |
| 2007/0236450 | A1 | 10/2007 | Colgate et al. |
| 2007/0236474 | A1 | 10/2007 | Ramstein |
| 2008/0060856 | A1 | 3/2008 | Shahoian et al. |
| 2008/0062143 | A1 | 3/2008 | Shahoian et al. |
| 2008/0062144 | A1 | 3/2008 | Shahoian et al. |
| 2008/0062145 | A1 | 3/2008 | Shahoian et al. |
| 2008/0068351 | A1 | 3/2008 | Rosenberg et al. |
| 2008/0129705 | A1 | 6/2008 | Kim et al. |
| 2008/0218488 | A1 | 9/2008 | Yang et al. |
| 2008/0303782 | A1 | 12/2008 | Grant et al. |
| 2009/0002328 | A1 | 1/2009 | Ullrich et al. |
| 2009/0079550 | A1 * | 3/2009 | Makinen ............... G06F 3/016 340/407.2 |
| 2010/0079379 | A1 | 4/2010 | Demuynck et al. |
| 2010/0085169 | A1 * | 4/2010 | Poupyrev ............ G06F 3/03543 340/407.2 |
| 2010/0141407 | A1 | 6/2010 | Heubel et al. |
| 2010/0152794 | A1 * | 6/2010 | Radivojevic ......... A61N 1/0452 607/2 |
| 2010/0156818 | A1 * | 6/2010 | Burrough et al. ............. 345/173 |
| 2010/0231367 | A1 | 9/2010 | Cruz-Hernandez et al. |
| 2010/0231508 | A1 | 9/2010 | Cruz-Hernandez et al. |
| 2010/0231539 | A1 | 9/2010 | Cruz-Hernandez et al. |
| 2010/0231540 | A1 | 9/2010 | Cruz-Hernandez et al. |
| 2010/0231541 | A1 | 9/2010 | Cruz-Hernandez et al. |
| 2010/0231550 | A1 | 9/2010 | Cruz-Hernandez et al. |
| 2011/0012717 | A1 | 1/2011 | Pance et al. |
| 2011/0043477 | A1 | 2/2011 | Park et al. |
| 2011/0215914 | A1 | 9/2011 | Edwards |
| 2011/0285667 | A1 * | 11/2011 | Poupyrev ............... G06F 3/045 345/174 |
| 2012/0038559 | A1 | 2/2012 | Radivojevic et al. |
| 2012/0062516 | A1 | 3/2012 | Chen et al. |
| 2012/0268386 | A1 * | 10/2012 | Karamath et al. ............. 345/173 |
| 2012/0268412 | A1 * | 10/2012 | Cruz-Hernandez ... G06F 3/0488 345/174 |
| 2012/0274599 | A1 * | 11/2012 | Schediwy ..................... 345/174 |
| 2013/0044049 | A1 | 2/2013 | Biggs et al. |

FOREIGN PATENT DOCUMENTS

| | | |
|---|---|---|
| WO | WO2010-033522 | 3/2010 |
| WO | WO 2010/105001 | 9/2010 |
| WO | WO2010-105006 | 9/2010 |
| WO | WO 2010/139171 | 12/2010 |

OTHER PUBLICATIONS

Chubb et al.; "ShiverPaD: A Glass Haptic Surface that Produces Shear Force on a Bare Finger"; *Transactions on Hapics*; 2010; pp. 1-10; vol. X, No. X.

Minsky; "Computational Haptics: The *Sandpaper* System for Synthesizing Texture for a Force-Feedback Display"; PhD Thesis; Massachusetts Institute of Technology, Cambridge, MA; Jul. 6, 1995; pp. 1-217.

http://niremf.ifac.cnr.it/tissprop/htmlclie/htmlclie.htm; Sep. 20, 2012; pp. 1-3.

www.senseg.com; Sep. 20, 2012; pp. 1-2.

http://www.teslatouch.com/; Sep. 20, 2012; pp. 1-4.

Reznik, D; Canny, J, (1998). A flat rigid plate is a universal planar manipulator. In IEEE International Conference on Robotics and Automation.

O. Bau, I. Poupyrev, A. Israr, and C. Harrison, "TeslaTouch: Electrovibration for Touch Surfaces," *User Interface Science and Technology* (*UIST*) Oct. 3-6, 2010. New York.

S. Grimnes, "Electrovibration, cutaneous sensation of microampere current," *Acta. Physiol. Scand.*, vol. 118, No. 1, pp. 19-25, Jan. 1983.

K. Kaczmarek, "Electrotactile display of computer graphics for bline—final report," National Eye Institute grant 5-R01-EY10019-08, Dec. 23, 2004.

K. Kaczmarek, K. Nammi, A.K. Agarwal, M.E. Tyler, S.J. Haase, and D.J. Beebe. "Polarity effect in electrovibration for tactile display." IEEE Trans on Biomedical Engineering, 53(10):2047-2054, 2006.

R. M. Strong and D. E. Troxel, "An electrotactile display," *IEEE Trans. Man-Mach Syst.*, vol. MMS-11, No. 1, p. 72-79, 1970.

S. M. Biggs, S. *Haptic Interfaces*, chapter 5, pp. 93-115. Published by Lawrence Erlbaum Associates, 2002.

M. Minsky, *Computational Haptics: The Sandpaper System for Synthesizing texture for a force feedback display*. PhD thesis, Massachusetts Institute of Technology, Cambridge, MA, 1995.

G. Robles-De-La-Torre. Comparing the Role of Lateral Force During Active and Passive Touch: Lateral Force and its Correlates are Inherently Ambiguous Cues for Shape Perception under Passive Touch Conditions. pp. 159-164, 2002.

G. Robles-De-La-Torre and V. Hayward. Force can overcome object geometry in the perception of shape through active touch. *Nature*, 412:445-448, Jul. 2001.

J. Cerundolo, "Effect of Charge Migration in Electrostatic Tactile Displays," MS Thesis, Dept of Mechanical Engineering, Northwestern University, 2010.

http://niremf.ifac.cnr.it/tissprop/htmlclie/htmlclie.htm.

www.senseg.com.

http://www.teslatouch.com/.

Kaczmarek, K., J. Webster, P. Pach-y-Rita, and W. Tompkins, *Electrotactile and vibrotactile displays for sensory substitution systems*. IEEE Transactions on Biomedical Engineering, 1991. 38(1): pp. 1-16.

Tang, H. and D. Beebe, *A microfabricated electrostatic haptic display for persons with visual imairments*. IEEE Transactions on Rehabilitation Engineering, 1998. 6(3): pp. 241-248.

Mallinckrodt, E., A. Hughes, and W. Sleator, *Perception by the Skin of Electrically InducedVibrations*. Science, 1953. 118(3062): pp. 277-278.

A. Yamamoto, T. Ishii, and T. Higuchi, "Electrostatic tactile display for presenting surface roughness sensation," in *Industrial Technology, 2003IEEE International Conf. on*, Dec. 2003, pp. 680-684.

M. Takasaki, H. Kotani, T. Mizuno, and T. Nara, "Transparent surface acoustic wave tactile display," in *International Conf. on IntelligentRobots and Systems*, Aug. 2005, pp. 3354-3359.

T. Watanabe and S. Fukui, "A method for controlling tactile sensation of surface roughness using ultrasonic vibration," in *Proc. of IEEE International Conf. on Robotics and Automation*, vol. 1, May 1995, pp. 1134-1139 vol. 1.

M. Biet, F. Giraud, and B. Lemaire-Semail, "Implementation of tactile feedback by modifying the perceived friction," *The European PhysicalJournal Applied Physics*, vol. 43, No. 1, pp. 123-135, Jul. 2008.

(56) References Cited

OTHER PUBLICATIONS

L. Winfield, J. Glassmire, J. E. Colgate, and M. Peshkin, "T-pad: Tactile pattern display through variable friction reduction," in *World Haptics Conf.*, 2007, pp. 421-426.

D. Wang, K. Tuer, M. Rossi, and J. Shu, "Haptic overlay device for flat panel touch displays," in *Symposium on Haptic Interfaces for Virtual Environment and Teleoperator Systems*, 2004.

E. C. Chubb, J. E. Colgate, and M. A. Peshkin, "Shiverpad: A device capable of controlling shear force on a bare finger," in *Proc. of the WorldHaptics Conf*, 2009, pp. 18-23.

E. C. Chubb, "Shiverpad: A haptic surface capable of applying shear forces to bare finger," Master's thesis, Northwestern University, Evanston, IL, USA, 2009.

Y. Kato, T. Sekitani, M. Takamiya, M. Doi, K. Asaka, T. Sakurai, and T. Someya, "Sheet-type braille displays by integrating organic field-effect transistors and polymeric actuators," *IEEE Transactions on Electron Devices*, vol. 54, No. 2, pp. 202-209, Feb. 2007.

Pasquero and V. Hayward, "Stress: A practical tactile display with one millimeter spatial resolution and 700 hz refresh rate," in *Proc. of Eurohaptics*, Jul. 2003.

V. Vincent Levesque and V. Hayward, "Experimental evidence of lateral skin strain during tactile exploration," in *Proc. of Eurohaptics*, Jul. 2003.

C. Harrison and S. E. Hudson, "Providing dynamically changeable physical buttons on a visual display," in *Proc. of the 27th international conf. on Human factors in computing systems*, 2009, pp. 299-308.

ISR and WO for PCT/US2012/037348 dated Nov. 28, 2012.

European Search Report for EP Application No. 12 781 885.4 dated Mar. 4, 2015.

Goethals, Tactile Feedback for Robot Assisted Minimally Invasive Surgery: An Overview, paper [online], Jul. 2008.

\* cited by examiner

TOUCH INTERFACE DEVICE HAVING AN ELECTROSTATIC MULTITOUCH SURFACE AND METHOD FOR CONTROLLING THE DEVICE

CROSS-REFERENCE TO RELATED APPLICATIONS

This application claims priority benefit of U.S. Provisional Application No. 61/484,564, which also was filed on 10 May 2011 and is entitled "A Touch Interface Device Having An Electrostatic Multitouch Surface" (referred to herein as the "'564 Application"). This application is related to U.S. Provisional Application No. 61/484,544, which was filed on 10 May 2011 and is entitled "A Touch Interface Device Able To Apply Controllable Shear Forces To A Human Appendage" (referred to herein as the "'544 Application"). This application also is related to U.S. application Ser. No. 13/468,695, which is filed concurrently with the present application and is entitled "A Touch Interface Device And Method For Applying Controllable Shear Forces To A Human Appendage" (referred to herein as the "'695 Application"). The entire disclosures of the '564 Application, the '544 Application, and the '695 Application are incorporated by reference.

STATEMENT REGARDING FEDERALLY SPONSORED RESEARCH OR DEVELOPMENT

This invention was made with government support under grant numbers IIS0941581 and IIS0964075 awarded by the National Science Foundation. The government has certain rights in the invention.

BACKGROUND

Touch interface devices can include computing devices having display screens with touch sensitive surfaces that can be used to receive input from operators of the devices. For example, many smart phones, tablet computers, and other devices having touch sensitive screens that identify touches from operators as input to the devices. Other examples of touch interfaces can be found in laptop computers, gaming devices, automobile dashboards, kiosks, operating rooms, factories, automatic tellers, and a host of portable devices such as cameras and phones. Touch interfaces can provide flexible interaction possibilities that discrete controls do not.

"Haptics" refers to the perceptual system associated with touch. Haptics allows people to touch type, find a light switch in the dark, wield a knife and fork, enjoy petting a dog or holding a spouse's hand. Haptics is not just about moving one's hands, but includes perceptions such as feeling things, recognizing objects (even without looking at the objects), and controlling the way that people interact with the world.

Haptics in the form of vibration is a familiar feature of products such as pagers, cell phones, and smart phones. Some known devices use vibration a silent ringer or alarm, and other devices use vibration to provide feedback to the human hand (especially the fingertips) when using a touch screen. Some known touch interface devices use piezoelectric actuators to vibrate just the display screen of the device so that the vibration is felt under the fingertips (e.g., on the screen) and less so or not at all in the hand holding the mobile device (e.g., the vibration is not transmitted through the housing of the device). Such mechanical vibration can have certain drawbacks, such as relatively high energy consumption. Furthermore, such mechanical vibration may not support multitouch, in which multiple fingertips simultaneously or concurrently engage the display screen in more than one location. For example, in some known devices, the entire display screen or even the entire device vibrates. Because the entire screen or device vibrates, each fingertip touching the screen experiences the same effect. As a result, the haptic effects provided to each fingertip cannot be individually controlled (e.g., different from each other) at the same time.

Some other known devices use electrostatic actuation to generate vibrations of the fingertips. These devices use electric fields to apply vibratory forces directly to the fingertips, and therefore do not have any moving mechanical parts. The forces are highly localized and different fingers may in principle experience different forces. These devices, however, produce relatively small forces and can require relatively high voltages (e.g., 750-1000 volts). Moreover, because of the relatively small forces, the devices may be geared toward generating perceived textures only.

What is needed is a system for producing relatively large forces so that not only textures and vibrations, but other effects including virtual bumps, virtual holes, collisions, virtual toggle switches, and the like, can be produced. A need also exists for practical and efficient ways to provide different haptic effects to different fingertips at the same time (e.g., multitouch effects).

BRIEF DESCRIPTION

In one embodiment, a touch interface device includes a touch surface, a first electrode, and a second electrode. The "touch surface" of the device includes the top or exposed surface that is touched by an operator. As described below, the touch surface can be an insulating layer that covers the electrodes that are coupled to a screen, surface, or other portion of the device. Alternatively, the touch surface can be the exposed portion of the screen, surface, or other portion of the device, with the electrodes being disposed within the thickness of the touch surface or coupled to a bottom or unexposed side of the touch surface.

The first electrode is coupled with the touch surface and is configured to receive a first haptic actuation electric potential. The second electrode is coupled with the touch surface and is configured to receive a different, second haptic actuation electric potential having an opposite polarity than the first haptic actuation potential. The first and second electrodes generate an electrostatic force that is imparted on one or more appendages of an operator that touches the touch surface above both the first electrode and the second electrode in order to generate a haptic effect.

In another embodiment, another touch interface device includes a touch surface and elongated electrodes coupled to the touch surface. The electrodes include a first electrode oriented along a first direction and a second electrode oriented along a different, second direction. The first electrode extends over the second electrode at a first intersection. The first and second electrodes are configured to receive haptic actuation electric potentials of opposite polarities to generate an electrostatic force that is imparted on the one or more appendages of the operator that touch the touch surface above the first intersection.

In another embodiment, a method (e.g., for generating haptic effects on a touch surface of a touch interface device) includes applying a first haptic actuation electric potential having a first polarity to a first electrode coupled with a touch surface of a touch interface device. The method also includes applying a second haptic actuation electric potential having a second polarity to a second electrode that is coupled with the touch surface. The second polarity of the second haptic actuation potential is opposite of the first polarity of the first haptic actuation potential. The first and second haptic actuation potentials generate an electrostatic force that is imparted on one or more appendages of an operator that touch the touch surface above the first and second electrodes.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
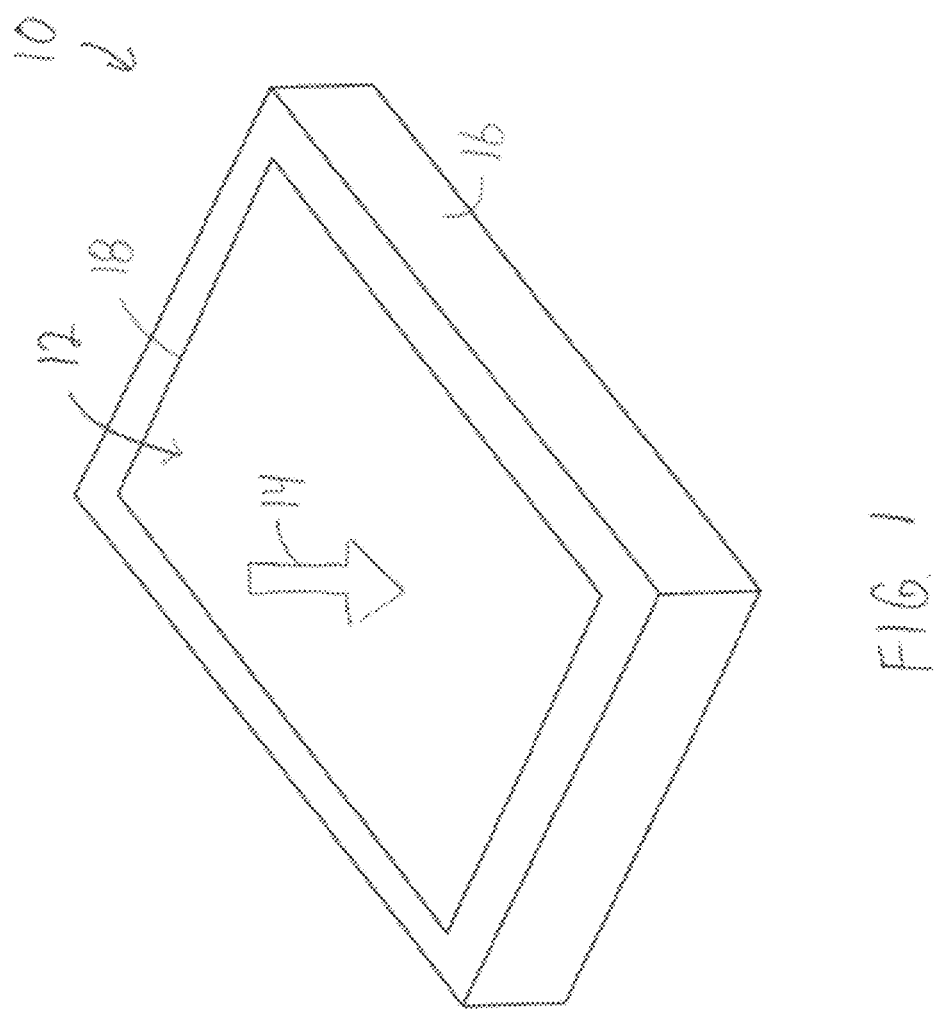
FIG. 1 is a perspective view of a touch interface device in accordance with one embodiment.

In accordance with one or more embodiments described herein, several approaches for generating relatively large changes in normal forces applied to appendages of an operator of a touch interface device when the appendages engage a touch surface on a touch sensitive screen of the touch interface device. The appendages are described herein as fingertips, but alternatively or additionally may include other appendages, such as toes or even other body parts such as the palm. Changing these normal forces results in relatively large changes in the frictional force between the fingertip and the touch surface of the touch sensitive screen. The changes in normal forces can be implemented using electrostatics. In one embodiment, to produce relatively large forces, a voltage is applied to one or more conductors or electrodes disposed below the touch surface and the voltage is modulated at a frequency. As used herein, the term "conductor" or "electrode" includes a conductive body to which an electric current, such as direct current, can be applied. The term "modulated" and various forms thereof includes changing polarities of a voltage applied to the electrode, such as from a designated positive voltage to a designated negative voltage or from the negative voltage to the positive voltage. In one embodiment, the voltage applied to the electrode is modulated at a frequency (referred to herein as a switching frequency) of at least 500 Hertz (500 Hz), and preferably above 5 kiloHertz (5 kHz). For example, the voltage may be modulated at a frequency of 50 kHz. In one embodiment, the voltage is modulated at a frequency of at least 5 kHz. Such frequencies may be used because the RC time constant of human skin may be relatively short so that any electrostatic forces acting on the skin may dissipate in tens of microseconds.

It should be appreciated that the ability to modulate force on one or more appendage is part of what makes haptic feedback via a touch surface possible. To create haptic experiences that are useful and/or interesting, it is generally important to generate forces that closely correspond to specific actions of the fingertips and/or to specific events occurring under software control. By way of illustration, consider a game in which the fingertips are used both to bat a ball, and to capture the ball. In this illustration, the ball is of course a simulated ball that appears on a computer display disposed underneath the touch surface. Consider the act of batting the ball with one finger. In this case, the normal force generated by the methods described here would depend on both the position and velocity of the finger as well as the position and velocity of the simulated ball. Even higher derivatives of position, such as acceleration, might also be involved. In one embodiment, the force exerted on the finger might increase when the position of the finger intersects that of the surface of the ball, indicating a collision. The force might also depend on the relative velocity of the finger and the ball, increasing for higher velocities. Thus we see that, unlike many existing technologies, the force is not a simple vibration that varies strictly as a function of time, but is a frictional reaction force that varies as a function of state variables such as positions, velocities and accelerations. Now consider the act of capturing the ball and holding it between two fingers. In this case, the reaction forces at the two fingers, which are again functions of state variables such as positions and velocities, should point in approximately opposite directions. As the ball is held, the forces should persist. Thus we see that, unlike many existing technologies, the force is neither a simple vibration nor even a transient. The abilities to generate persistent forces, and to generate different forces at different fingers, are advantages of the technology described here. In the above discussion, it should be apparent that the technology described here has been integrated with means of measuring the position of one or more fingertips, and with means of displaying graphic images (and also audio, since events like batting a ball are often accompanied by sound). There are many techniques for measuring fingertip positions which are known in the art, and which may be used here. These include, without limitation, resistive, surface capacitive, projected capacitive, infrared, acoustic pulse recognition, and in-cell optical sensing. There are also many techniques for displaying graphic images and audio.

Two or more sets of electrodes having different voltages applied to the electrodes can be used to provide normal forces (and corresponding frictional forces) to a fingertip (or other appendage) that engages the touch surface of a touch interface device. The electric circuit that includes the electrodes and that is used to generate the forces can be closed directly through the fingertip rather than through capacitance of the body of the operator of the device to the ground, or through an auxiliary ground contact. For example, a single fingertip may close the circuit across two electrodes. Doing so can enable application of larger normal forces and may enable multitouch to be realized with an interdigitated electrode pattern, as described below.

As described herein, an expression for the Coulomb (electrostatic) normal force on a finger is provided, and effects of "leakage" through the skin of the fingertip are added to this expression. A dynamic model that includes the effects of body capacitance is also provided. This mathematical model helps the reader understand how one or more embodiments of the presently described inventive subject matter can achieve higher forces imparted on fingetips than one or more known devices, and how multitouch feedback can be implemented. Specific approaches to controlling force amplitude at multiple surface locations are also provided.

In one embodiment, current levels that pass through the skin, due to the touch interface device, may be below a level that creates direct electrical sensory stimulation. Instead, the normal force on the fingertip that is generated by the electrically charged electrodes can be modulated, which in turn modulates frictional forces on the fingertip. Sensory stimulation to the fingertip may then occur when there is relative motion between the fingertip and the touch surface of the touch sensitive screen in the touch interface device. The sensation comes from variations in friction at different times and/or locations on the touch surface, and is therefore mechanosensory.

Localized regions of touch sensation may be provided on a touch interface device for one or more fingers (referred to as contact points). For example, different normal forces and frictional forces may be generated for different fingertips engaging different regions of the same touch surface of the device.

The normal forces applied to the fingertips may be achieved using relatively low voltages, such as voltages below 750V rms. The normal forces may be generated by achieving relatively high electric field strengths in the stratum corneum of the fingertip and insulator. For thin insulators, sufficiently high field strengths may be achieved with much lower voltages, such as 10-100V rms.

In one embodiment, no auxiliary grounding is used with the touch interface device. For example, a conductive strap or body that is coupled with the device or with the operator of the device and a ground reference may not be used or needed. Instead, multiple electrodes in the device may be excited out of phase to create an electric circuit that does not involve the capacitance of the operator's body to ground, nor is a connection needed to the operator's body.

FIG. 1 is a perspective view of a touch interface device 10 in accordance with one embodiment. The touch interface device 10 can represent a computing device, such as a smart phone, tablet computer, and the like. The touch interface device 10 includes a housing 16 having a touch surface 12 (also referred to as a touch screen 12). The touch surface 12 may be a touch-sensitive surface or display screen that receives input from an operator of the device 10 based on touch. Alternatively or additionally, the touch surface 12 may be another portion of the device 10 that does not display information (e.g., images, text, videos, and the like) and/or that does not sense touch by the operator. Although not shown in FIG. 1, the device 10 may include a control unit, such as a processor, controller, or other logic-based device, that performs operations of the device 10 based on input provided by the operator touching the surface 12. While the discussion herein focuses on human fingertips engaging the touch surface 12, alternatively, one or more other human appendages (e.g., toes) may be used. One or more embodiments described herein provide ways to apply attractive forces on fingertips that touch the touch surface 12. The attractive forces can provide haptic effects, such as perceived changes in the friction of the touch surface 12. For example, the attractive forces can be oriented normal to the touch surface 12, as indicated by the arrow 14. The attractive forces can be varied to change the friction between the fingertip and the touch surface 12, thereby creating haptic effects that are perceived by the operator.

Figure 2:
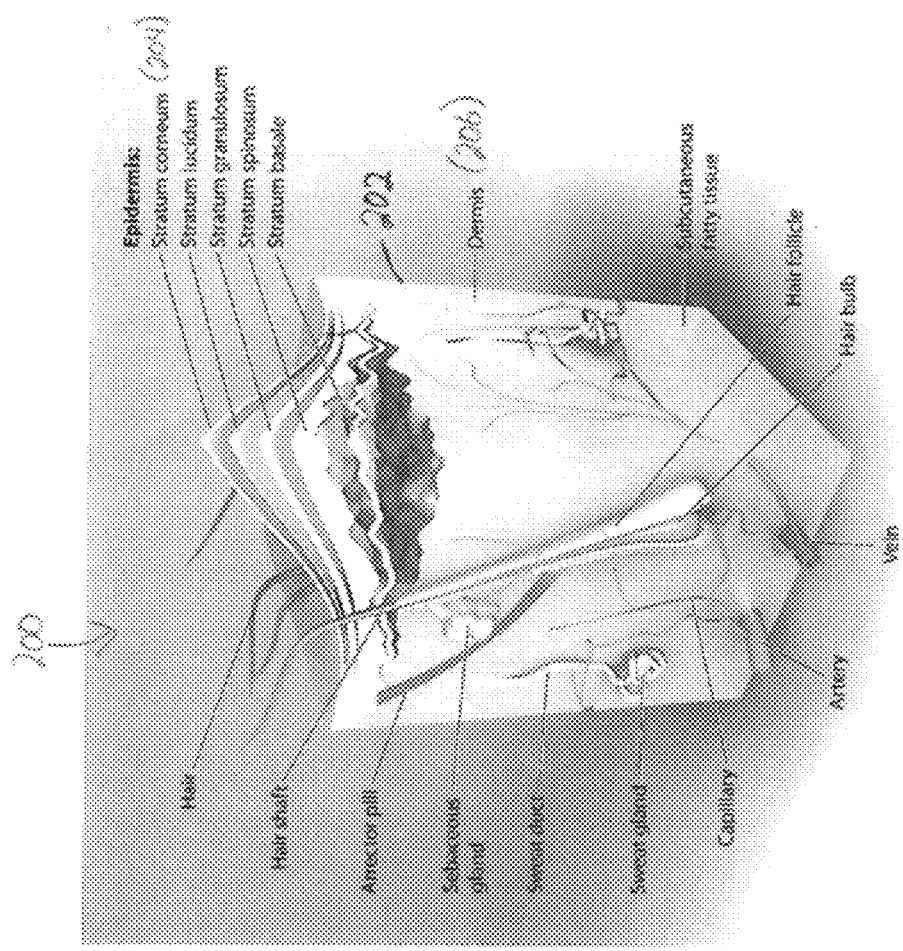
FIG. 2 illustrates a model of an outermost layer of human skin of a fingertip.
Figure 3:
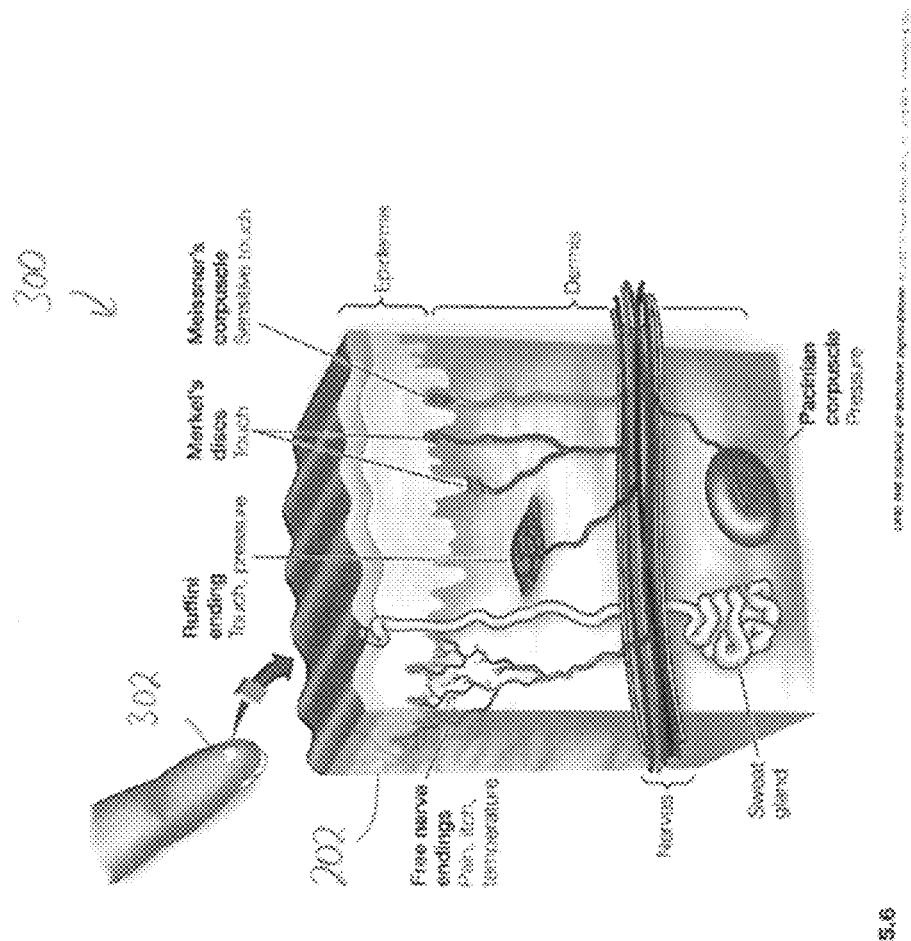
FIG. 3 illustrates another model of the outermost layer of human skin of the fingertip.

FIGS. 2 and 3 illustrate models 200, 300 of an outermost layer 202 of human skin of a fingertip 302, such as the layer that contacts the touch surface 12 of the interface device 10 shown in FIG. 1. The outermost layer 202 is referred to as the stratum corneum 204. The stratum corneum contacts the external world. The stratum corneum includes of a layer of dead cells that forms a moisture barrier. This layer is typically 20-40 micrometers (μm) thick across much of the body, but can be considerably thicker on the soles of the feet and the fingertips. For the fingertips, the stratum corneum is typically 200-400 μm thick, varying with finger (thickest at the thumb), gender (thicker in men), and age.

The stratum corneum is the outermost layer of the skin and the outermost layer of the epidermis. The mechanoreceptors responsible for touch sensation lie below the stratum corneum in the dermis 206. Of particular note, the Pacinian corpuscles (which are responsible for vibration detection) lie well below in much more highly hydrated tissue.

Figure 4:
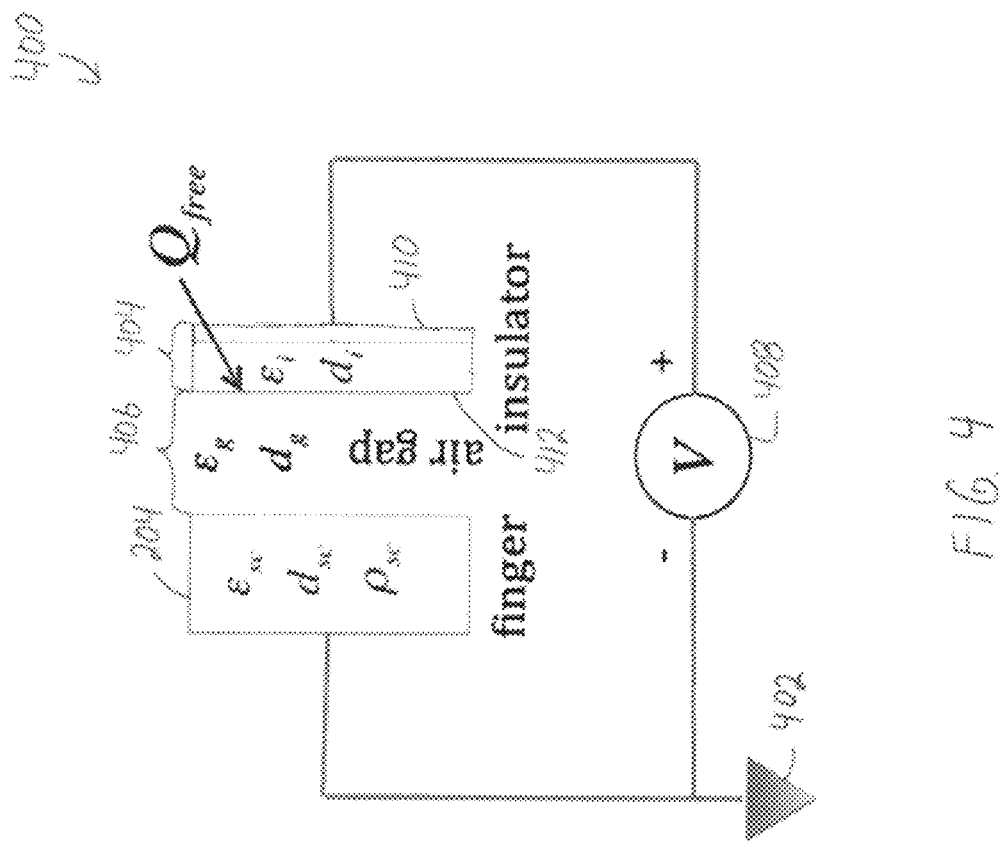
FIG. 4 is an electric circuit used to demonstrate a model of attractive forces applied to a fingertip that engages a touch surface of the interface device shown in FIG. 1.

FIG. 4 is an electric circuit 400 used to demonstrate a model of attractive forces applied to a fingertip 302 (shown in FIG. 3) that engages the touch surface 12 of the interface device 10 shown in FIG. 1. When the fingertip touches the touch surface 12, the human body may serve as an electric ground reference 402. The stratum corneum 204 (e.g., "finger" in FIG. 4) may serve as a dielectric layer between the body ground and the outside world. An electrostatic device 404 may be modeled as a electrode 410 that is covered by an insulator 412. The electrode 410 includes a conductor such as a conductive pad (which should be understood to include materials that are much less conductive than metals) coupled to the touch surface 12. For example, the electrode 410 can be disposed on the same side of the touch surface 12 that the operator acts to touch and be covered by an insulative layer as the insulator 412. Alternatively, the electrode 410 may be disposed below the surface 12 on a side of the surface 12 that is opposite of the side that the operator acts to touch. In another embodiment, the electrode 410 may be disposed within the surface 12. An air gap 406 may or may not exist between the stratum corneum 204 and the insulator 412. At least some free charge ($Q_{free}$ or $Q_f$) may be on a surface of the insulator 412. The free charge may include charge that has leaked from the stratum corneum 204 (or through the air). In the circuit 400 shown in FIG. 4, the subscript sc refers to the stratum corneum 204, the subscript g refers to the air gap 406, and the subscript i refers to the insulator 412. The term $\in$ refers to relative permittivity, d refers to thickness, and ρ refers to resistivity. Therefore, $\in_{sc}$ refers to the relative permittivity of the stratum corneum 204, $\in_g$ refers to the relative permittivity of the air gap 406, and $\in_i$ refers to the relative permittivity of the insulator 412, $d_{sc}$ refers to the thickness of the stratum corneum 204, $d_g$ refers to the thickness (e.g., size) of the air gap 406, $d_i$ refers to the thickness of the insulator 412, and $\rho_{sc}$ refers to the resistivity of the stratum corneum 204. Additionally, $\in_o$ refers to the relativity of free space and A refers to the area of the fingertip contacting the insulator.

A power source 408 can apply a potential difference, or voltage (V), to the electrode 412 to generate an electric field between the electrode 410 and the fingertip 302 (e.g., the stratum corneum 204). The electric field extends across the insulator 404 and the air gap 406 to the fingertip 302 (e.g., stratum corneum 204). Several separate electrodes 410 (e.g., electrodes that are not directly coupled with each other so that the electrodes do not engage each other) can be coupled with the touch surface 12, such as by being disposed on a first side of the touch surface 12 that faces the operator during use of the device 10. The touch surface 12 of the device includes the top or exposed surface that is touched by an operator. The touch surface can be an insulating layer that covers the electrodes that are coupled to a screen, surface, or other portion of the device. Alternatively, the touch surface can be the exposed portion of the screen, surface, or other portion of the device, with the electrodes being disposed within the thickness of the touch surface or coupled to a bottom or unexposed side of the touch surface. As used herein, the term "above" does not necessarily indicate a relative direction with respect to the ground or gravity. Given these conditions, the electric field in each region of the touch surface 12 can be computed from Gauss's Law and the relationship between the electric field and a voltage or potential difference (V) applied to the electrode 410 may be expressed as follows:

$$-\varepsilon_g E_g + \varepsilon_i E_i = \frac{Q_{free}}{\varepsilon_o A} \quad \text{(Equation \#1)}$$

$$-\varepsilon_{sc} E_{sc} + \varepsilon_g E_g = 0 \quad \text{(Equation \#2)}$$

$$d_{sc} E_{sc} + d_g E_g + d_i E_i = -V \quad \text{(Equation \#3)}$$

The electric field solutions (e.g., the electric fields generated in the stratum corneum 204, the air gap 406, and the insulator 412, or $E_{sc}$, $E_g$, and $E_i$, respectively) can be expressed as:

$$E_{sc} = \frac{-V - \frac{Q_f}{C_i}}{d_{sc} + \frac{\varepsilon_{sc}}{\varepsilon_i} d_i + \frac{\varepsilon_{sc}}{\varepsilon_g} d_g} \quad \text{(Equation \#4)}$$

$$E_g = \frac{-V - \frac{Q_f}{C_i}}{d_g + \frac{\varepsilon_g}{\varepsilon_i} d_i + \frac{\varepsilon_g}{\varepsilon_{sc}} d_{sc}} \quad \text{(Equation \#5)}$$

$$E_i = \frac{-V + \frac{Q_f}{C_g} + \frac{Q_f}{C_{sc}}}{d_i + \frac{\varepsilon_i}{\varepsilon_{sc}} d_{sc} + \frac{\varepsilon_i}{\varepsilon_g} d_g} \quad \text{(Equation \#6)}$$

where the capacitances (e.g., the capacitance of the stratum corneum 204, or $C_{sc}$, the capacitance of the air gap 406, or $C_g$, and the capacitance of the insulator 412, or $C_i$) are defined as:

$$C_{sc} = \frac{\varepsilon_{sc}\varepsilon_o A}{d_{sc}} \quad \text{(Equation \#7)}$$

$$C_g = \frac{\varepsilon_g \varepsilon_o A}{d_g} \quad \text{(Equation \#8)}$$

$$C_i = \frac{\varepsilon_i \varepsilon_o A}{d_i} \quad \text{(Equation \#9)}$$

A potential energy (U) that is stored in this system (e.g., the potential energy stored in the stratum corneum 204, the air gap 406, and/or the insulator 412) can be expressed as:

$$U = \frac{1}{2} C_{sc}(E_{sc} d_{sc})^2 + \frac{1}{2} C_g(E_g d_g)^2 + \frac{1}{2} C_i(E_i d_i)^2 \quad \text{(Equation \#10)}$$

A force ($F_{sc}$) that is imparted on the stratum corneum 204 by application of the voltage to the electrode 410 may be based on a gradient of the potential energy (U) with respect to a change in the thickness of the air gap 406 (e.g., $d_g$) as follows:

$$F_{sc} = -\frac{\partial U}{\partial d_g} \quad \text{(Equation \#11)}$$

$$F_{sc} = -C_{sc} E_{sc} d_{sc}^2 \frac{\partial E_{sc}}{\partial d_g} - \frac{1}{2} \frac{\partial C_g}{\partial d_g}(E_g d_g)^2 - \\ C_g E_g d_g \left( E_g + d_g \frac{\partial E_g}{\partial d_g} \right) - C_i E_i d_i^2 \frac{\partial E_i}{\partial d_g} \quad \text{(Equation \#12)}$$

Rather than evaluate the general result, only the case as $d_g \to 0$ may be considered, such as when the finger is in contact with the insulator. The value of $\in_g$ may be 1, which can be appropriate for air. The result is:

$$F_{sc} = \frac{\varepsilon_i d_i}{2 d_{eq}^2} \left[ C_i V^2 - \frac{Q_{free}^2}{C_i} \right] \quad \text{(Equation \#13)}$$

-continued $$\text{where } d_{eq} = d_i + \frac{\varepsilon_i}{\varepsilon_{sc}} d_{sc} \quad (7) \quad \text{(Equation \#14)}$$

In the case that $Q_{free}=0$, this expression can be rewritten as:

$$F_{sc} = \frac{\varepsilon_o A V^2}{2\left(\frac{d_{sc}}{\varepsilon_{sc}} + \frac{d_i}{\varepsilon_i}\right)^2} \quad \text{(Equation \#15)}$$

Additionally, the following terms may be defined:

$$d_{i-sc} = \frac{d_{sc}}{\varepsilon_{sc}} + \frac{d_i}{\varepsilon_i} \quad \text{(Equation \#16)}$$

$$C_{i-sc} = \frac{C_i C_{sc}}{C_i + C_{sc}} = \frac{\varepsilon_o A}{d_{i-sc}} \quad \text{(Equation \#17)}$$

so that the expression of force on the finger can be expressed as:

$$F_{sc} = \frac{C_{i-sc} V^2}{2 d_{i-sc}} \quad \text{(Equation \#18)}$$

The free charge ($Q_{free}$) can play an important role in the force model. As $Q_{free}$ grows, the force drops (e.g., Equations #13 and 14). The free charge can be due at least in part to the flow of current through the stratum corneum 204 due to the non infinite resistivity of the stratum corneum 204, although the free charge could also accumulate slowly by the motion of ions through the air.

Figure 5:
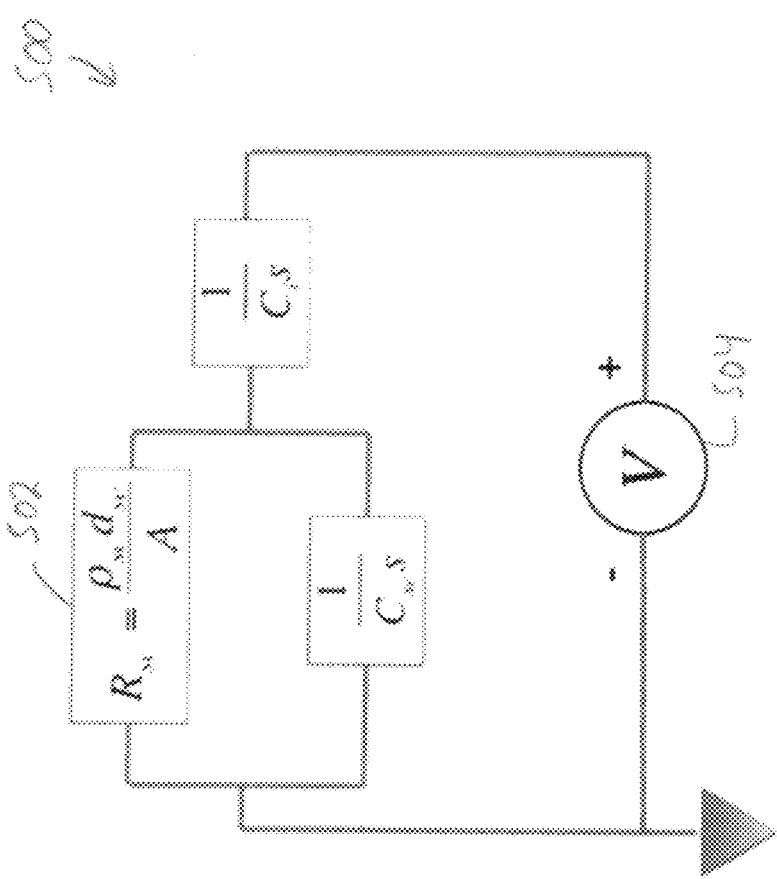
FIG. 5 illustrates an impedance model of a system that includes the stratum corneum of the fingertip and an insulator shown in FIG. 4 in accordance with one embodiment.

FIG. 5 illustrates an impedance model 500 of a system that includes the stratum corneum 204 and insulator 412 in accordance with one embodiment. The free charge ($Q_{free}$) may be the integral of the current that flows through a resistor 502 ($R_{sc}$), which can represent the resistance provided by the stratum corneum 204. The stratum corneum 204 and insulator 412 can be part of a larger dynamic system, the specifics of which can depend on how the interface device 10 is built, and which can include a power source 504 (e.g., a battery). A basic model of the system may assume a single conductor (e.g., an electrode 410) under the insulator 412 (e.g., the insulative or dielectric layer on the electrode 410, at least a portion of the touch screen 12 of the device 10, and the like) and no auxiliary grounding of the person using the device 10, or of the device 10 itself. The conductor 410 may have a significant resistance, especially if the conductor is made of or includes a light transmissive material such as Indium Tin Oxide (ITO). While this resistance may be relevant when considering energy efficiency and heating, the resistance may be of less importance when considering forces generated. For example, at the switching frequencies that may be used to supply electric energy to the conductor 410, the electrical impedance of the system may be dominated by the capacitance of the operator body and of the insulator 412 rather than the resistance of the conductor 410.

Figure 6:
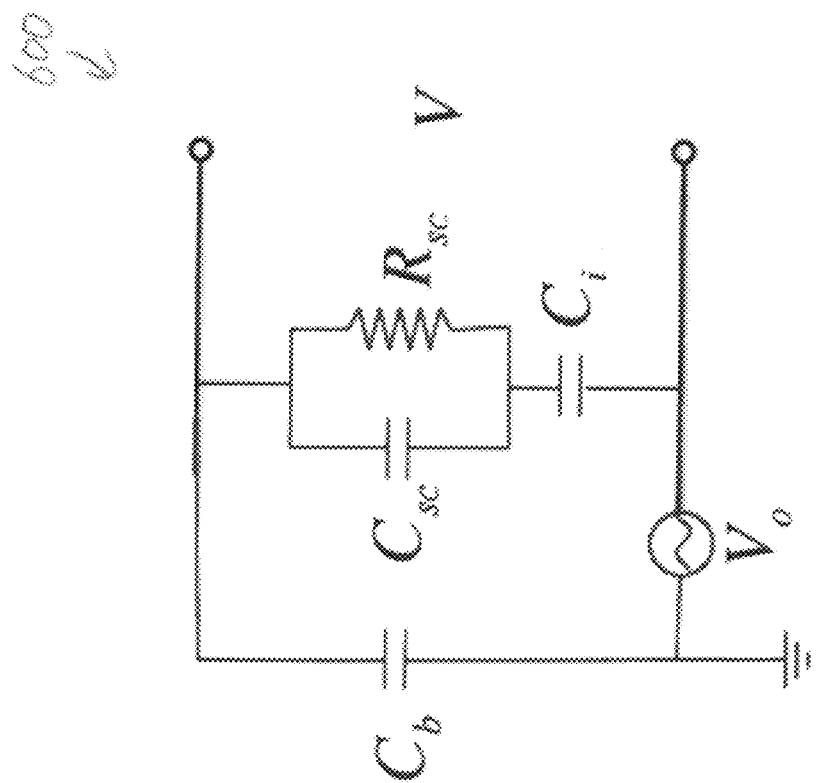
FIG. 6 is a diagram of a circuit of the system that includes the stratum corneum, the insulator, and a conductor shown in FIG. 4 when the circuit described above in FIG. 5 is closed through the capacitance of the operator body ($C_b$) with respect to ground.

FIG. 6 is a diagram of a circuit 600 of the system that includes the stratum corneum 204, the insulator 412, and the conductor 410 when the circuit described above in FIG. 5 is closed through the capacitance of the operator body ($C_b$) with respect to ground. Note that, in this example, it is assumed that the interface device has an Earth ground. In general, however, the interface device 10 may be floating relative to Earth ground (e.g., for a mobile device). In that case, $C_b$ can represent the capacitance of the operator body with respect to the interface device 10. The transfer function for the circuit 600 from input voltage $V_o$ to $Q_{free}$ can be expressed as:

$$\frac{Q_{free}}{V_o} = \frac{C_i C_b}{C_i + C_b} \frac{1}{R_{sc}\left(\frac{C_b C_{sc} + C_b C_i + C_i C_{sc}}{C_b + C_i}\right)s + 1} \quad \text{(Equation \#18)}$$

A time constant of this transfer function can be important. For example, at frequencies above the inverse of the time constant, the magnitude of $Q_{free}$ can become quite small, which may allow for larger forces imparted on the fingertip touching the insulator 412 (e.g., the touch surface 12 of the interface device 10) to develop.

The value for the capacitance of the whole human body with respect to ground ($C_b$) may be 150 picoFarads (pF). If the insulator 412 has a relative permittivity of $\in_i=5$, which may be typical for glass and many plastics, and the area of engagement between the fingertip and the insulator 412 is approximately 1 cm², then $C_i=442$ pF. The values associated with fingertip may depend on moisture content of the skin. Some examples of resistivity and relative permittivity values for the fingertip include:
 (a) Dry skin at a switching frequency of 10 kiloHertz (kHz): $\rho_{sc}=5000$ Ohm-meters ($\Omega$m), $\in_{sc}=1,133$
 (b) Wet skin at a switching frequency of 10 kHz: $\rho_{sc}=333$ $\Omega$m, $\in_{sc}=29,000$ where the switching frequency represents the frequency at which the polarity of the voltage applied to the conductor 412 is switched. With the area assumption above and a stratum corneum thickness of 200 μm, the resistance and capacitance of the fingertip may be:
 (a) Dry skin at 10 kHz: $R_{sc}=10$ k$\Omega$, $C_{sc}=5$ nanoFarads (nF)
 (b) Wet skin at 10 kHz: $R_{sc}=667\Omega$, $C_{sc}=128$ nF Using the above values to compute the system time constant (τ), the time constant is calculated to be as follows, although other time constants could result from other conditions:
 (a) Dry skin: $\tau_{system}=51$ microseconds (μs) (3.1 kHz)
 (b) Wet skin: $\tau_{system}=86$ μs (1.9 kHz)

To achieve relatively strong normal forces applied to the finger, in one embodiment, the switching frequency or excitation frequency (e.g., the frequency at which the polarity of voltage applied to the conductor/electrode 412 is switched) is approximately 3 times the frequency implied by the above time constants. At excitation frequencies of 5-6 kHz and above, the effects of the free charge may be reduced and can even become negligible. As a result, the force applied to the finger can depend primarily on the voltage V acting across the stratum corneum 204 and the insulator 410 from the conductor/electrode 412. The transfer function from input voltage $V_o$ to V, where the input voltage is the voltage applied to the conductor/electrode, can be expressed as:

$$\frac{V}{V_o} = \frac{C_b}{C_i + C_b} \frac{R_{sc}(C_{sc} + C_i)s + 1}{R_{sc}\left(\frac{C_b C_{sc} + C_b C_i + C_i C_{sc}}{C_b + C_i}\right)s + 1} \quad \text{(Equation \#19)}$$

The zero occurs at a lower frequency than the pole; thus, if the same assumption of operating above $1/\tau_{system}$, the force may be computed as:

$$F_{sc} = \left(1 + \frac{C_{i-sc}}{C_b}\right)^{-2} \frac{C_{i-sc} V_o^2}{2d_{i-sc}} \quad \text{(Equation \#20)}$$

This Equation 20 may be compared to Equation 18. The term that is added to Equation 20 represents the effect of the operator body's capacitance, which can be quite significant. Using the parameters above, and assuming dry skin, the added factor has a value of 0.073. For example, the force on the fingertip can be attenuated by a factor of 0.073.

One or more of the values in term $$\left(1 + \frac{C_{i-sc}}{C_b}\right)^{-2}$$

of Equation 20 can be examined to increase the force applied to the fingertip. In one embodiment, the capacitance of the operator's body ($C_b$) can be increased. For example, the operator may hold onto a ground strap, or a conductor that is coupled with a ground reference, when the operator's fingertip engages the touch surface. Of particular note, an array of ground electrodes may be disposed on the top of the touch surface 12 such that a small portion of the finger's contact patch is always grounded while the majority of the contact patch is capacitively coupled to a high-voltage electrode. For handheld devices such as mobile phones or tablet computers, the concept of ground, ground reference, ground electrodes, and ground strap may refer to the local ground of the device 10, rather than referring to Earth ground. In some embodiments, the function of a ground strap may be obtained by the operator making electrical contact with the device 10, for example through a conductive case (e.g., the housing 10) or back of the device 12, or even such a case or back with a insulating layer that nevertheless allows an elevated value of $C_b$. Similarly it should be understood that the potential of the local ground of the device 10 may bear an arbitrary relationship to potential of earth ground. Alternatively, the electrical circuit 600 may be modified such that the body's capacitance $C_b$ plays a much reduced role.

Figure 7:
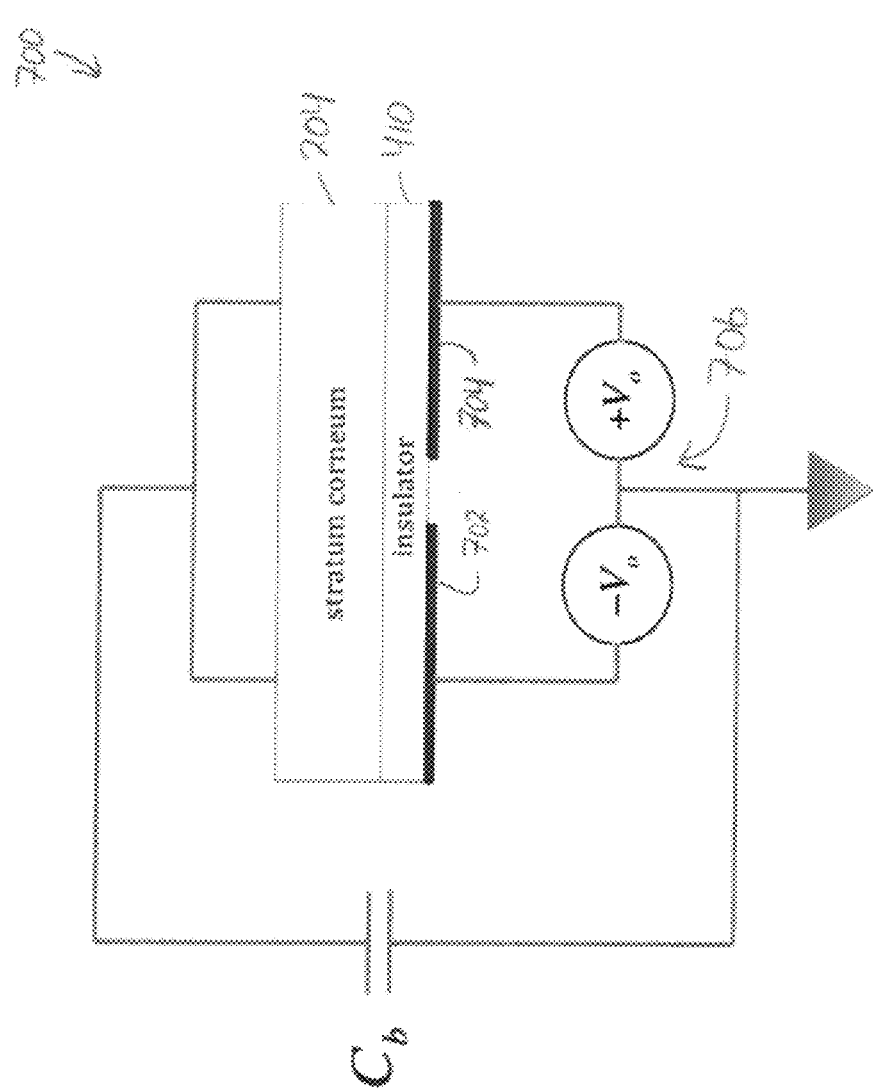
FIG. 7 is a circuit diagram of a circuit having a plurality of conductors or electrodes in accordance with another embodiment.
Figure 8:
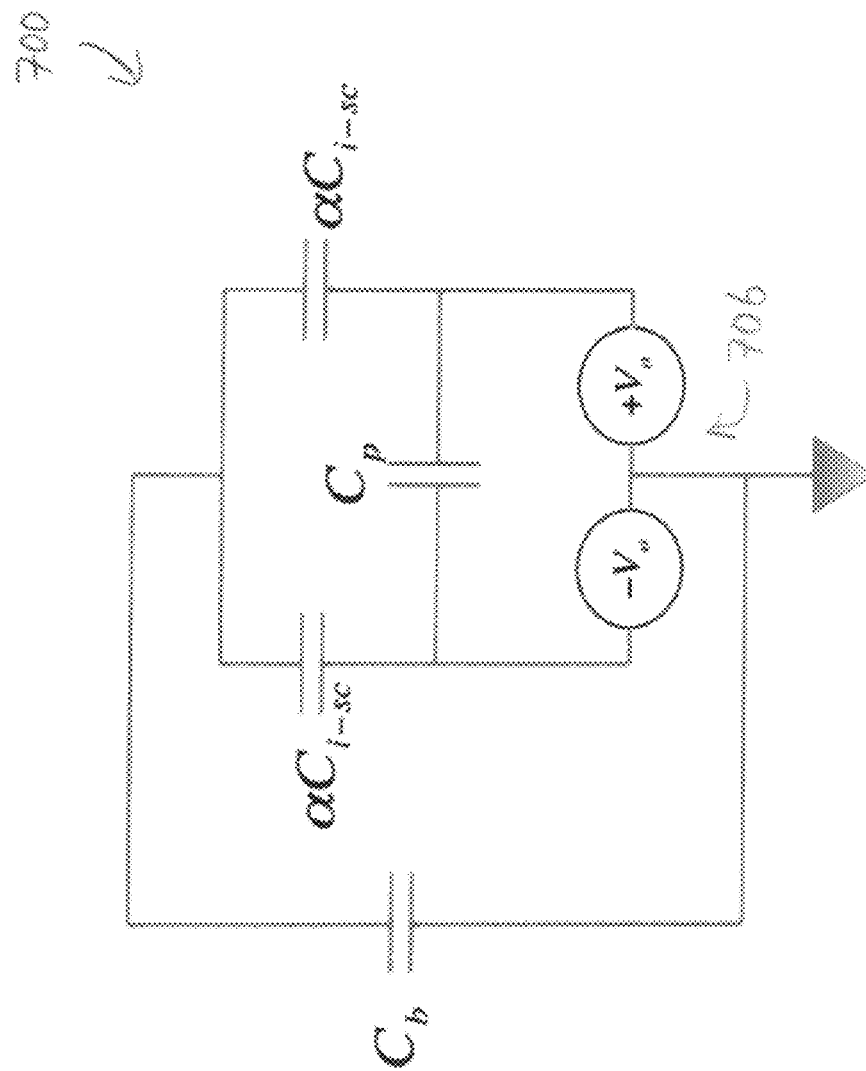
FIG. 8 is another circuit diagram of a circuit having a plurality of conductors or electrodes in accordance with another embodiment.

FIGS. 7 and 8 are circuit diagrams of a circuit 700 having a plurality of conductors or electrodes 702, 704 in accordance with another embodiment. In contrast to the circuits described above having a single electrode 412 beneath the fingertip, the circuit 700 includes a plurality of electrodes 702, 704 beneath the fingertip. The electrodes 702, 704 may be supplied by a power source 706 with equal and opposite voltages ($-V_0$, $+V_0$), or with voltages substantially different from each other even if not equal and opposite. A change of ground reference can be arbitrary and may not affect the electrostatic forces. The potentials described herein are potentials relative to a convenient ground. The tissue underneath the stratum corneum 204 of the fingertip is relatively conductive and can complete the circuit 700 and reduce the relevance of or make irrelevant the capacitance of the operator's body ($C_b$) in the circuit 700. The switching frequency at which the voltages supplied to the electrodes 702, 704 changes polarity may be sufficiently high that charge leakage is significantly reduced and may be ignored. In FIG. 8, $C_p$ represents parasitic capacitance between the electrodes 702, 704 and α represents a ratio of the portions of the areas of the electrodes 702, 704 that are underneath the fingertip contact area A (e.g., the area that the finger contacts the touch surface 12). The force applied to the fingertip obtained with such a circuit 700 may be represented as:

$$F_{sc} = \frac{\alpha C_{i-sc} V_o^2}{d_{i-sc}} \quad \text{(Equation \#21)}$$

The attenuation term $$\left(1 + \frac{C_{i-sc}}{C_b}\right)^{-2}$$

from Equation 20 is not present in Equation 21, and the only loss versus Equation 17 is geometrical due to loss of the electrode area (e.g., α<0.5). The parasitic capacitance $C_p$ may not affect the force or may have a reduced impact on the force exerted on the fingertip, but may increase current drawn from the power supply 706 and lead to increased resistive losses. In one embodiment, the parasitic capacitance $C_p$ should be relatively small, such as on the order of 5 pF.

In addition to circuit 600, Equation 21 demonstrates that $d_{i-sc}$ can be reduced in order to increase the force level. The value of $d_{i-sc}$ depends on both the stratum corneum, which may not be altered, and the insulator layer 412, which can be. In practice, the electrical thickness, $d_i/\in_i$, of the insulator layer 412 can be reduced by decreasing the physical thickness of the insulator layer 412 (e.g., the thickness $d_i$) and/or increasing the dielectric constant $\in_i$. For instance, in one embodiment, the insulator layer 412 may be a 1 micron thick layer of Hafnium Oxide ($HfO_2$). $HfO_2$ has a relatively high dielectric constant (~25) as well as good breakdown strength. Many other materials may be chosen as well. For instance, silica, Titanium Oxide, Barium Titanate, and various polymers, such as parylene.

As the top layer of the device 10, the insulator layer 412 also may be responsible for meeting other requirements, such as optical transmission, anti-reflection, providing a moisture barrier, providing hydrophobic and oleophobic properties, and the like. Toward this end, various surface treatments and coatings may be applied to the insulator layer 412 without significantly affecting the electrical properties (e.g., $d_i$ and $\in_i$). The surface of the insulator layer 412 may also be textured using techniques such as acid etching. Texture may reduce reflections and provide more consistent frictional properties without affecting electrical characteristics.

The attenuation term from Equation 20 may be added back into the calculation of the force imparted on the fingertip when the electrodes 702, 704 are driven with the same voltage polarity, or when only one electrode 702 or 704 is driven (e.g., receives voltage) and the other electrode 704 or 702 is allowed to float relative to ground. In the latter case, the force may be expressed as:

$$F_{sc} = \alpha\left(1 + \frac{C_{i-sc}}{C_b}\right)^{-2} \frac{C_{i-sc} V_o^2}{2d_{i-sc}} \quad \text{(Equation \#22)}$$

The difference between the forces calculated by Equations 21 and 22 can be used to create localized haptic effects while also reducing the number of electrodes 702, 704 that are used to create the haptic effects.

Figure 9:
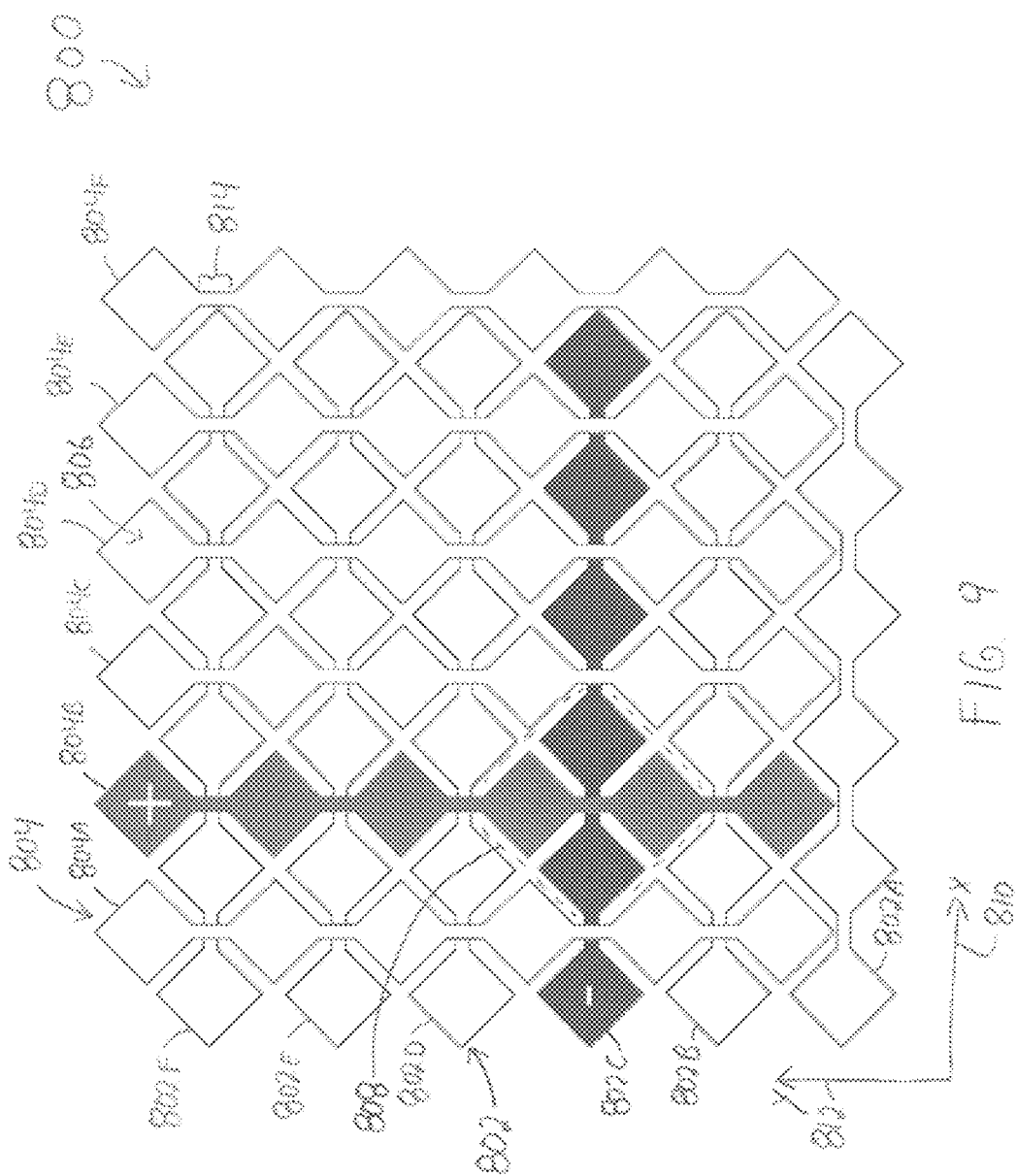
FIG. 9 is a schematic diagram of a lattice of electrodes in accordance with one embodiment.

FIG. 9 is a schematic diagram of a lattice 800 of electrodes 802, 804 (e.g., electrodes 802A-F and electrodes 804A-F) in accordance with one embodiment. The electrodes 802, 804 are elongated conductive bodies that are oriented along perpendicular x- and y-axes 810, 812, respectively. As shown in FIG. 9, the electrodes 804 are disposed above the electrodes 802 such that the electrodes 802, 804 are not conductively coupled with each other and the electrodes 802, 804 can be separately supplied with current. For example, the electrodes 802, 804 may be conductively separated from each other in areas where the electrodes 802, 804 cross each other such that no conductive pathway exists between the electrodes 802, 804 that cross each other. A dielectric or insulating layer may be provided between the electrodes 802, 804 to prevent the electrodes 802, 804 from being conductively coupled. Alternatively or additionally, the electrodes 802, 804 may be vertically spaced apart from each other such that the electrodes 802, 804 are not conductively coupled.

The lattice 800 may be disposed below the insulative touch surface 12 of the touch interface device 10. Alternatively, the lattice 800 may be disposed on the same side of the touch surface 12 that is touched by an operator of the device 10. In another embodiment, the lattice 800 may be located within the thickness of the touch surface 12. The electrodes 802, 804 include conductively interconnected diamond shaped pads 806. Alternatively, the pads 806 may have a different shape. The diamond shape of the pads 806 may allow multiple electrodes 802, 804 to be excited simultaneously while reducing stray capacitance. The pads 806 in the same electrode 802 or 804 are conductively coupled with each other by conductive bridges 814.

In the illustrated embodiment, the electrodes 802C and 804B (one vertical electrode and one horizontal electrode) are activated while the other electrodes 802, 804 are not activated (or are activated but only to an lesser voltage.) When a fingertip is placed above an intersection 808 of the activated electrodes 802C, 804B (e.g., the location where the electrode 804B extends over the electrode 802C), the force applied to attract the fingertip toward the electrodes 802C, 804B is represented by Equation 21, and may be relatively large. As a result, the operator may feel his or her finger pulled toward the touch surface 12 of the device 10. When the fingertip is placed elsewhere along the length of either electrode 802C or 804B and away from the intersection 808, the force applied to pull the finger toward the touch surface 12 may be represented by Equation 22, and may be reduced relative to the force applied when the finger is above the intersection 808.

If the lattice 800 includes M electrodes 804 disposed side-by-side along the x axis 810 and N electrodes 802 disposed side-by-side along the y axis 812 (e.g., where M and N represent integer numbers that may be the same number or different numbers), then the number of individual regions of the touch surface 12 that may be separately addressed (e.g., apply voltage to) in this manner is M×N. For example, a total of M×N regions of the lattice 800 on, below, or within the touch surface 12 may have both a horizontal electrode 802 and a vertical electrode 804 excited within the region. The ability to address M×N regions with haptic outputs while only having M+N electrodes 802, 804 may represent a significant savings in complexity of the interface device 12.

Figure 10:
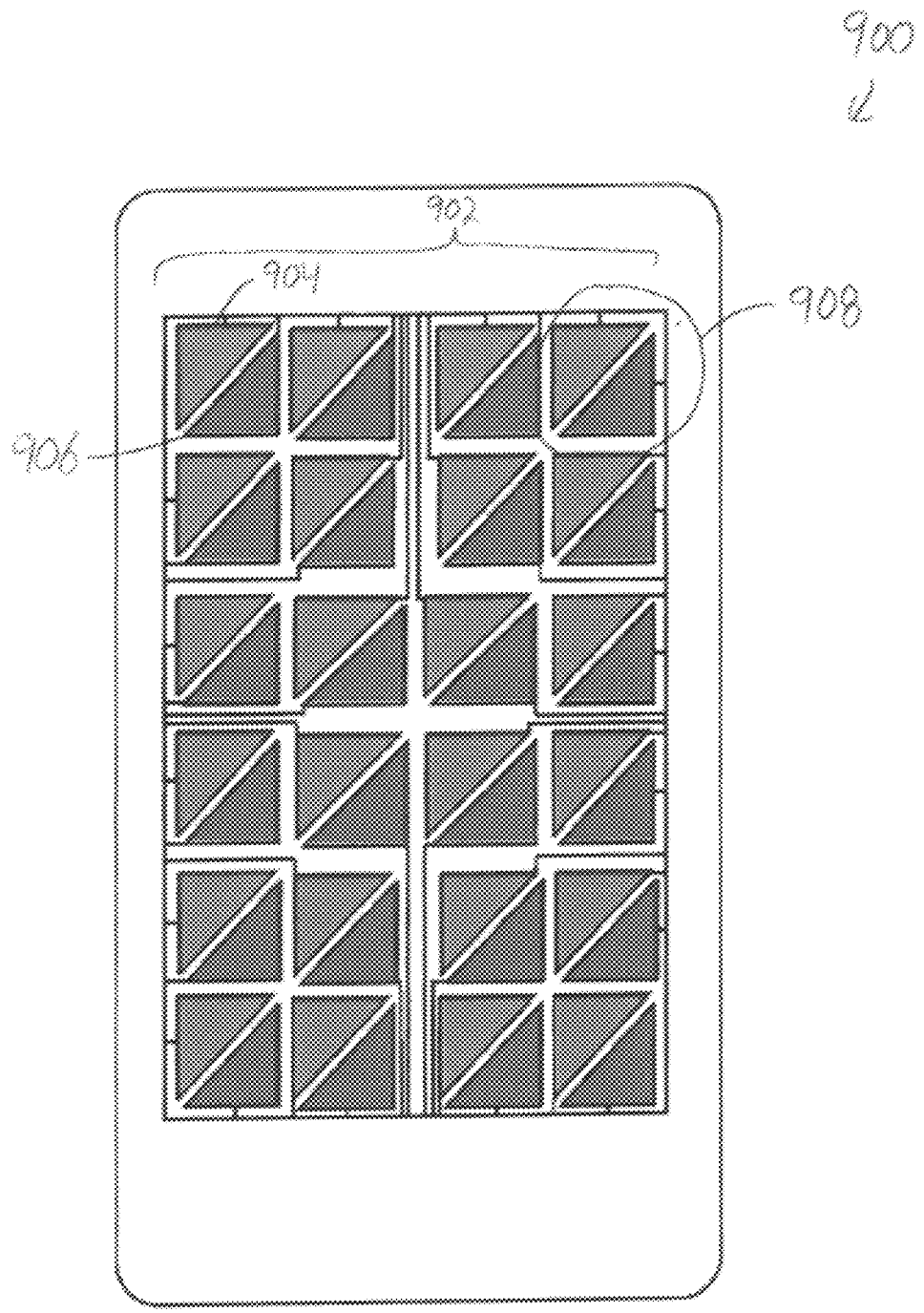
FIG. 10 is a schematic diagram of a touch interface device having a lattice of electrodes in accordance with another embodiment.

FIG. 10 is a schematic diagram of a touch interface device 900 having a lattice 902 of electrodes 904, 906 in accordance with another embodiment. The interface device 900 may be similar to the device 10 shown in FIG. 1. The lattice 902 of electrodes 904, 906 may be positioned on, below, or within a touch surface of the device 900, such as the surface 12 of the device 10. The lattice 902 provides an arrangement of pairs 908 of the electrodes 904, 906 that can be activated to provide multiple regions of forces. For example, the electrodes 904, 906 in different pairs 908 may be simultaneously or concurrently activated (e.g., supplied with voltage) to provide forces on different fingertips touching different portions of the touch screen of the device 900 at the same time.

Figure 11:
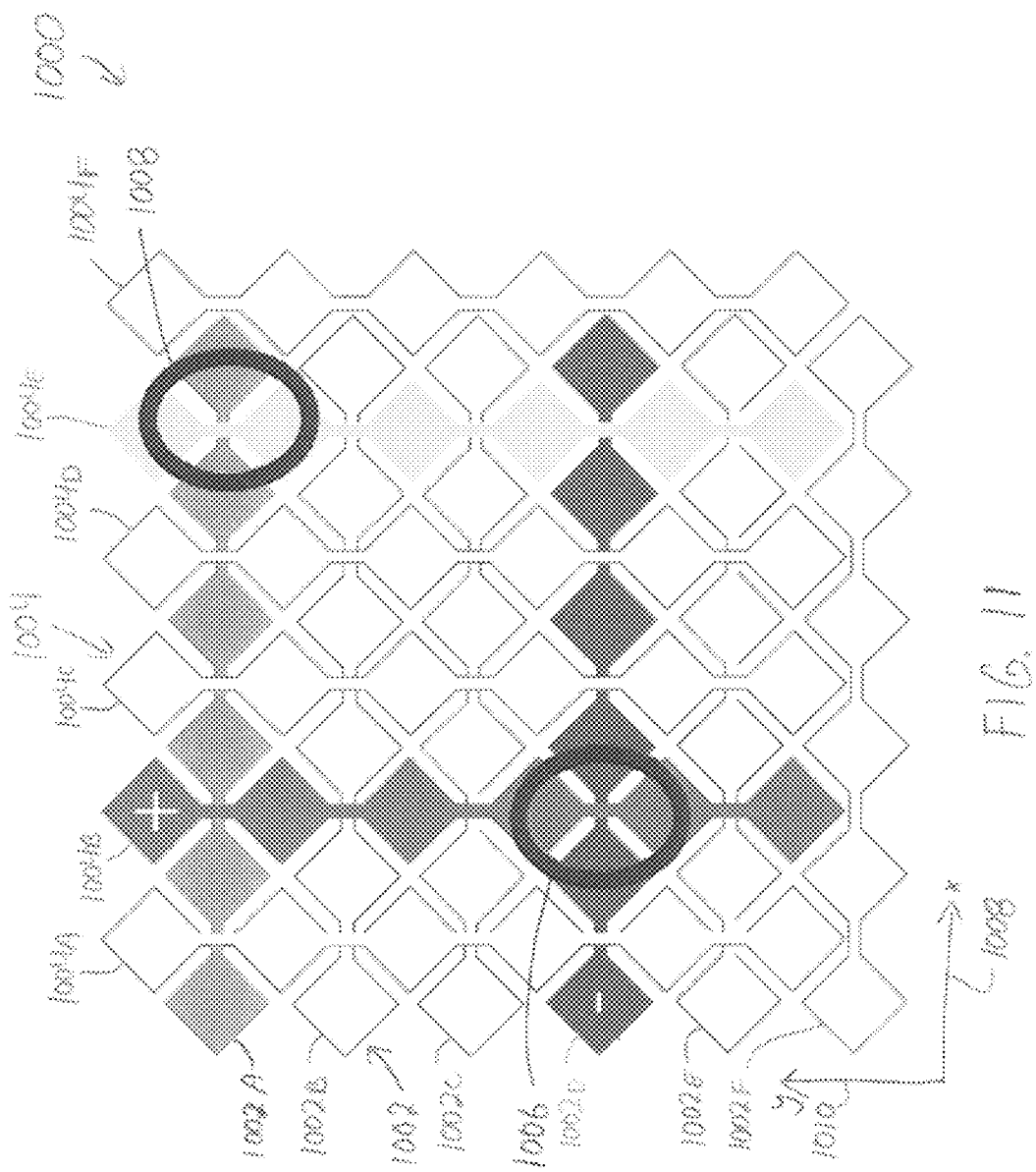
FIG. 11 is a schematic diagram of a lattice of electrodes in accordance with one embodiment.

FIG. 11 is a schematic diagram of a lattice 1000 of electrodes 1002, 1004 (e.g., electrodes 1002A-F and electrodes 1004A-F) in accordance with one embodiment. Similar to the electrodes 802, 804 (shown in FIG. 9) and/or 904, 906 (shown in FIG. 10), the electrodes 1002, 1004 may be positioned on, below, or within the touch surface 12 of the device 10. The electrodes 1002, 1004 are elongated conductive bodies that are oriented along perpendicular x- and y-axes 1008, 1010, respectively. As shown in FIG. 11, the electrodes 1004 extend over the electrodes 1002 such that the electrodes 1002, 1004 are not conductively coupled with each other and the electrodes 1002, 1004 can be separately supplied with current, similar to as described above in connection with the electrodes 802, 804.

If specific and/or different forces are desired at a first intersection 1006 of a first set of the electrodes 1002D, 1004B and at a different, second intersection 1008 of a different, second set of the electrodes 1002A, 1004E, the first set of the electrodes 1002D, 1004B can be excited with voltage and the second set of the electrodes 1002D, 1004B also can be excited with voltage from a power source. In one embodiment, the voltage applied to the sets of electrodes 1002, 1004 at each intersection 1006, 1008 can be phased differently. For example, the voltage applied to the electrode 1002D may be expressed as $V_{1002D}=\sin(\omega t+\phi)$ and the voltage applied to the electrode 1004B may be expressed as $V_{1004B}=\sin(\omega t)$. Similarly, the voltage applied to the electrode 1002A may be expressed as $V_{1002A}=\sin(\omega t+\phi)$ and the voltage applied to the electrode 1004E may be expressed as $V_{1004E}=\sin(\omega t)$.

Forces that attract fingertips toward the touch surface 12 also may be generated all along lengths of each active electrode 1002A, 1002D, 1004B, 1004E, but such forces may be relatively small compared to the forces applied to fingertips when fingertips are at either or both of the intersections 1006, 1008. If there is only a single fingertip placed at one of the intersections 1006 or 1008, but not both, it is still possible to control the force applied to the fingertip by setting one more phase angle; e.g., the phase of the electrode 1002A relative to the phase of the electrode 1004E.

When fingertips are placed at all four intersections—for example, at four locations that form a rectangle aligned with the electrodes 1002, 1004E, 1002D, 1004B—it may still be possible to generate compelling haptic effects, but the forces may need to be coordinated. For instance, it may be not undesirable that the forces at two of the fingers be constrained to be equal.

The forces applied to different fingertips that concurrently or simultaneously touch the touch surface 12 can be individually controlled. For example, a first force applied to a first fingertip engaging a first region of the touch surface 12 may be different (e.g., greater) than a second force applied to a different, second fingertip engaging a different, second region of the touch surface 12. For example, given sinusoidal voltages applied to the electrodes with a frequency greater than $1/\tau_{system}$ and an amplitude $V_o$, Equations 21 and 22 described above may represent potential extremes of the forces (e.g., maximum and minimum, or upper and lower) that are possible with the two-electrode configurations shown in one or more of FIGS. 9 through 11. Alternatively, Equation 21 and/or 22 may represent one or more forces applied to the fingertips that are not the maximum and minimum, but forces between the potential maximum and minimum forces.

The forces applied to one or more of the fingertips may be varied between the values expressed in Equation 21 and/or 22. For example, the amplitude of the voltage ($V_o$) applied to one or more of the electrodes may be changed to change the forces. As another example, a phase difference ($\Phi$) between the voltages applied to the two electrodes may be altered to change the forces. In one embodiment, the force applied to one or more fingertips may be increased when the phase difference ($\Phi$) in the voltages applied to the two electrodes is 180 degrees. Conversely, the force applied to one or more fingertips may be decreased when the phase difference ($\Phi$) is 0 degrees. Differences in the phase between 0 degrees and 180 degrees may scale the force accordingly.

In one embodiment, the voltages applied to the electrodes may be applied in sinusoidal profiles or waveforms. Alternatively, the voltages may be applied in square waveforms. Other waveforms may also be used.

Figure 12:
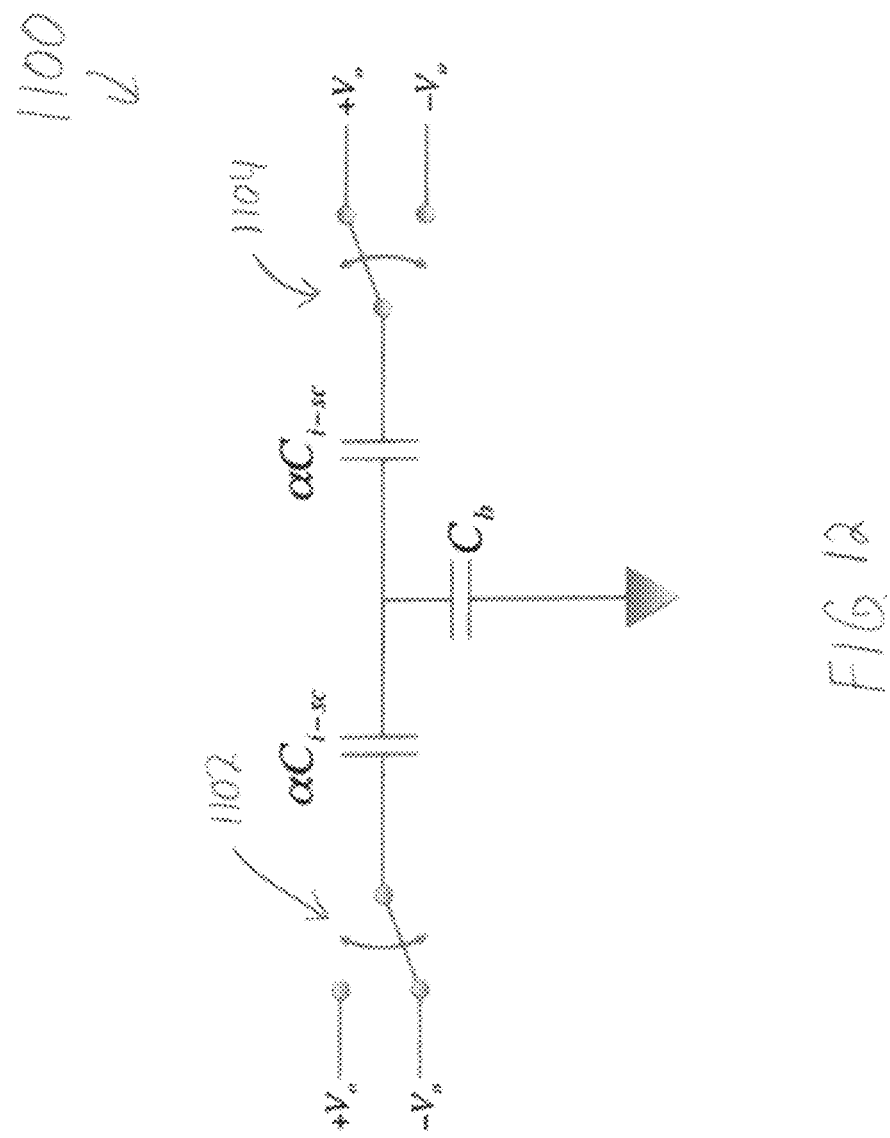
FIG. 12 is a diagram of a circuit that models the circuit shown in FIGS. 7 and 8 with a square wave voltage applied to one or more electrodes of the interface device shown in FIG. 1.

FIG. 12 is a diagram of a circuit 1100 that models the circuit 700 shown in FIGS. 7 and 8 with a square wave voltage applied to one or more electrodes of the interface device 12 described herein. The square wave voltages applied to the electrodes is represented by switches 1102, 1104. For example, when a positive polarity voltage is applied to a first electrode, the switch 1102 couples the positive voltage (+$V_O$) with the first electrode and when a negative polarity voltage is applied to the first electrode, the switch 1102 couples the negative voltage (−$V_O$) with the first electrode. Similarly, when a positive polarity voltage is applied to a different, second electrode, the switch 1104 couples the positive voltage (+$V_O$) with the second electrode and when a negative polarity voltage is applied to the second electrode, the switch 1102 couples the negative voltage (−$V_O$) with the second electrode. The switches 1102, 1104 may be coordinated with each other such that when the positive voltage (+$V_O$) is applied to the first or second electrode, the negative voltage (−$V_O$) is applied to the other second or first electrode, and vice-versa. As noted previously the ground reference can be arbitrary. The voltage magnitudes applied to the electrodes may be equal, positive and negative, or may differ from each other.

The forces applied to fingertips by the different electrodes may be varied. For example, the frequency at which the voltage applied to one or more of the electrodes is switched between polarities may be altered to control the applied force. In one embodiment, at frequencies below a frequency of $1/\tau_{system}$, the force may increase with increasing frequency. For example, the force may linearly grow with increasing frequency.

In another embodiment, the width of the voltage pulses applied to the electrodes may be modulated. For example, the voltages may be applied in a plurality of states, such as a "high force state" and a "low force state." The high force state may occur when two electrodes are connected to opposite rails (e.g., the electrodes receive opposite polarities of the voltage) and the low force state may occur when the electrodes are connected to the same rail (e.g., the electrodes receive the same polarity of voltage). A "pulse" of the voltage may represent a time ($\alpha$)T that the electrodes are in the high force state followed by a time $(1-\alpha)T$ that the electrodes are in the low force state. The variable a controls or represents an average force amplitude. In one embodiment, to increase the range of forces that can be applied by the electrodes, the value of T may be less than $\tau_{system}$.

In another embodiment, the switches 1102, 1104 may be alternated between the positive and negative polarities of voltage at a fixed rate, but with a controllable phase difference in order to control the amplitude of the forces applied by the electrodes.

In another embodiment, the number of pulses of voltage applied to the electrodes may be modulated to vary the amplitude of the forces applied by the electrodes. For example, if several pulses of voltage are applied in a 50 kHz pulse train, a set of 50 voltage pulses may repeat at 1 kHz, which is above the bandwidth of tactile perception of a human operator. The forces may be modulated by turning off or on some of the pulses in the set of 50. For example, if 40 pulses are on and 10 pulses are off, the force applied may be 80% of a potential peak value. This may be similar to frequency modulation, but the fundamental can remain at 50 kHz. Alternatively, one might choose to repeat sets of voltage pulses at a frequency below 1 kHz, for instance at 300 Hz, which would produce a sensation of vibration for the human operator. It should be evident that a great variety of haptic effects can be created through friction modulation, and these effects may derive from patterns of activation which are not perceived as vibration, combined with patterns of activation which are perceived as vibration.

As described above, finger position sensing on a touch surface 12 may be performed using conductive layers (e.g., electrodes 410, 702, 704, 802, 804, 904, 906, 1002, 1004) below an insulating layer (e.g., insulator 412), to measure the location of the finger or fingers of an operator on the touch surface 12. These conductive layers can be patterned so that multiple electrically isolated regions are present, such as described above in connection with FIGS. 9 through 11. As described above, conductive bridges or jumpers may be used to conductively couple physically non-contiguous conducting regions (e.g., pads 806), such as shown in and described in connection with FIG. 9. There can be more than one conductive layer, separated by insulating layers, to form an alternating vertical sequence (with respect to a direction that extends between an appendage of an operator and the touch surface 12) of electrodes.

Figure 13:
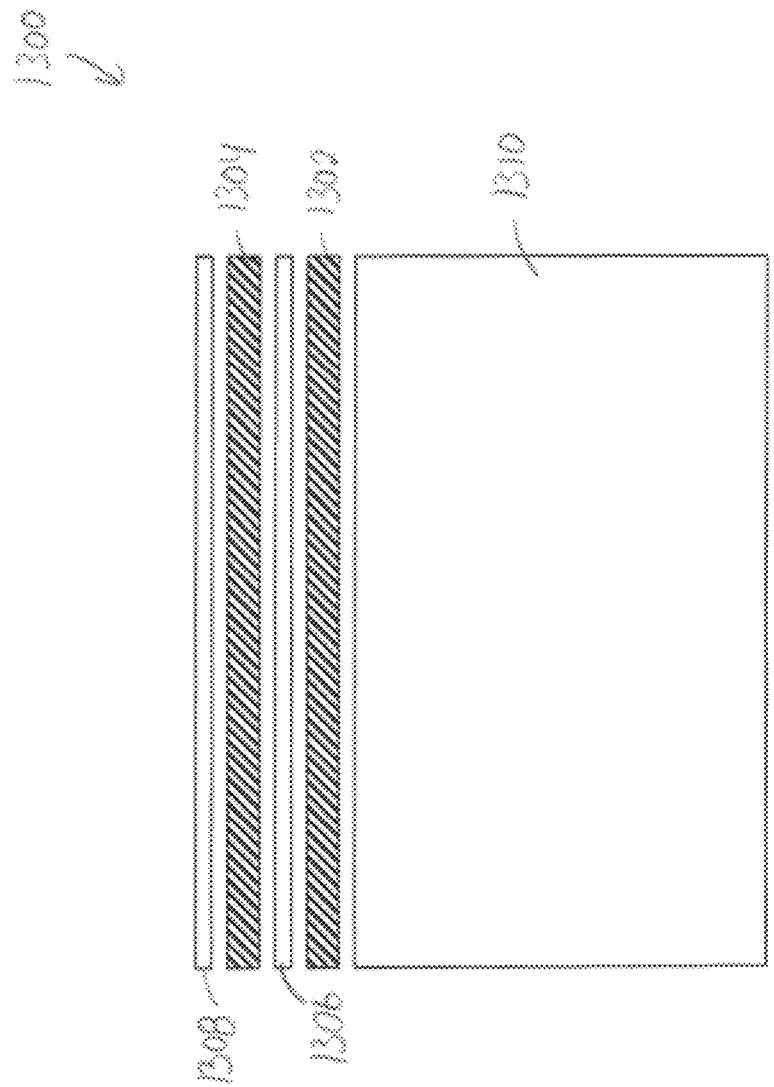
FIG. 13 illustrates a cross-sectional view of a portion of an example touch surface having multiple electrodes and insulating layers.

FIG. 13 illustrates a cross-sectional view of a portion of an example touch surface 1300 having multiple electrodes 1302, 1304 and insulating layers 1306, 1308. The surface 1300 may be similar to the touch surface 12 of the device 10 described above. For example, the surface 1300 may be capable of perceiving touch from an operator and of generating haptic effects that are perceived by the operator. The device 1300 includes the multiple electrodes 1302, 1304 and insulating layers 1306, 1308 stacked on top one another and coupled with a screen 1310, such as a display screen or other surface of the device 10.

The electrodes 1302, 1304 may be used for sensing touch of the device 10 that includes the surface 1300 and/or for generating haptic effects, as described herein. As shown in FIG. 13, the electrodes and insulating layers are disposed on a side of the device that an operator acts to touch. As described herein, the operator touching or acting to touch the surface 1300 may involve the operator touching the insulating layer 1308 instead of actually engaging the underlying screen 1310. The electrodes and insulating layers may be at least partially transparent, or light transmissive, so that a visual display can be seen through the touch screen 1300 by the operator, as described above. One transparent and electrically conductive material that can used for such layers is Indium Tin Oxide, ITO.

As described above, one or more embodiments of the inventive subject matter described herein generates haptic effects using a conductive layer beneath an insulating layer. The conductive layer may be patterned. In one embodiment, the same conductive layers may be used to both sense the position of the appendages of the operator and to display or produce haptic effects that are felt by the appendages. Since patterned conductive layers and insulating layers can be used in finger position sensing, and since patterned conductive layers and insulating layers can be used in creating haptic effects, it can be desirable to be able to use the same layer or layers for both of these functions. Even if different conducting and/or insulating layers are used for the functions of sensing position of the appendages of the operator and of providing haptic effects, it can be desirable that the different conductive layers not interfere with each other. Interference can be likely due to the relatively strong capacitive coupling of the conductive layers that are separated by relatively small distances.

Whether the conductive layers (e.g., electrodes) used for sensing and haptics are the same or different conductive layers, the functions have a propensity to interfere with each other. That is because, in one embodiment, both sensing and haptic actuation use AC voltages supplied to the conductive layers. The haptic actuation of the conductive layers may use larger voltages while the sensing function of the conductive layer uses smaller voltages. As a result, the haptic actuation is likely to interfere with the sensing function more than the sensing function interfering with haptic actuation. The interference is likely even if the conductive layer or layers are divided across the surface 12 between the two functions, because of the capacitive coupling between parts of the conductive layers.

To allow a finger position sensing function to go on undisturbed by haptic actuation on the same or a different conductive layer, or to reduce the interference caused by haptic actuation, the functions may be separated by having the functions operate at different frequencies (e.g., by controlling the frequencies at which electric current is supplied to the conductive layer for the different functions) and/or by time multiplexing the functions (e.g., by temporally controlling when the conductive layer is supplied with electric current to provide each function).

To separate the functions by frequency, one function (e.g., providing haptic effects or sensing touch) is performed at a different frequency or frequency range than another function. For example, haptic actuation of the conductive layers or electrodes may occur at a lower frequency or frequencies than the frequency or frequencies used for sensing touch. Alternatively, haptic actuation may be performed at a larger frequency or frequencies than sensing. In one embodiment, haptic actuation of the conductive layers or electrodes is performed at frequencies of 101 KHz or less, although other, considerably lower or higher frequencies can be used. Capacitive sensing of the conductive layers or electrodes may be performed at frequencies of is 5 MHz or greater, although higher or lower frequencies can also be used. Voltages that are applied to the conductive layers for capacitive sensing may be smaller than the voltages applied to the conductive layers for creating the haptic effects. For example, the voltages used for sensing may be on the order of a few volts, such as 3.3 volts or 5 volts, or another voltage, while larger voltages may be applied for generating haptic effects. The relatively smaller voltage and higher frequency signal that is applied to the conductive layer for sensing touch can be superimposed on the larger voltage and lower frequency signal that is applied to the conductive layer for haptic actuation. The high frequency signal used for sensing touch can be stripped out again from the conductive layer for interpretation by using a high pass filter.

Figure 14:
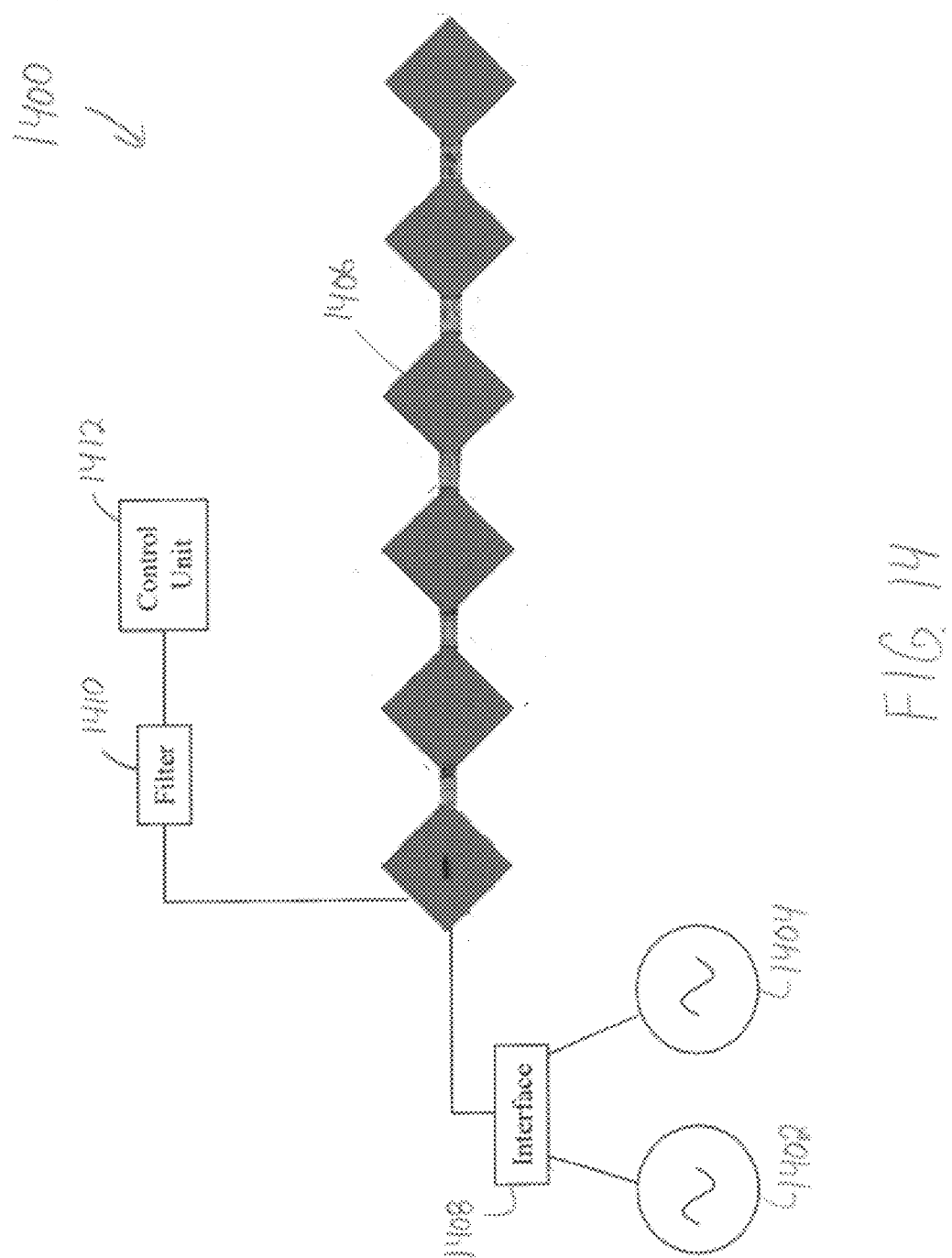
FIG. 14 illustrates an example of a circuit that can be used for supplying different signals to a common electrode.

FIG. 14 illustrates an example of a circuit 1400 that can be used for supplying different signals 1402, 1404 to a common electrode 1406. The circuit 1400 can supply the signals 1402, 1404 to activate the electrode 1406 for both sensing and haptic effect functionality. The electrode 1406 may represent one or more of the electrodes described above. The circuit 1400 may entirely or partially be disposed within one or more of the touch interface devices described herein.

The signal 1402 may represent a haptic activation signal that is supplied from one or more power sources of the touch interface device and can include an electric current having a first voltage and a first frequency. The signal 1402 is supplied to the electrode 1406 to create the haptic effects described herein. The signal 1404 may represent a sensing signal that is supplied from one or more power sources of the touch interface device and can include an electric current having a lower, second voltage and a larger, second frequency relative to the first voltage and first frequency of the signal 1402. In one embodiment, the first voltage of the haptic activation signal 1402 is 50 volts and the second voltage of the sensing signal 1404 is 5 volts. Alternatively, one or more other voltages may be used. The first frequency of the haptic activation signal 1402 may be 10 KHz while the second frequency of the sensing signal 1404 is 5 MHz, although one or more other frequencies may be used in another embodiment.

The signals 1402, 1404 may be supplied to an interface device 1408 that is conductively coupled with the electrode 1406. The interface device 1408 can include one or more components that superimpose, mix, interleave, sum, or otherwise concurrently or simultaneously place both signals 1402, 1404 on the same electrode 1406. For example, the interface device 1408 may represent a mixer, summer, modulator, or the like. The haptic activation signal 1402 can drive the electrode 1406 to provide haptic effects described above while the sensing signal 1404 may be used to sense touch by an operator. The sensing signal 1404 on the electrode 1406 can be monitored to detect touch by coupling the electrode 1406 with a filter 1410, such as a high pass filter, that strips out the sensing signal 1404 from the current on the electrode 1406. The stripped out sensing signal 1404 may then be communicated to a control unit 1412 that examines the sensing signal 1404 to determine if an operator has touched the insulating layer disposed above the electrode 1406. The control unit 1412 can include one or more processors, microcontrollers, and the like, that operate based on hard-wired and/or software instructions to carry out one or more operations. In one embodiment, the control unit 1412 may direct the application or supply of current to electrodes of a touch interface device, such as by controlling the application of the signals 1402, 1404 to the electrode 1406. Other touch interface devices described herein may include the same or similar control units to control the supply of electric current to the respective electrodes.

In another embodiment, to separate activation of an electrode for producing haptic effects and for sensing touch using time multiplexing, the capacitive sensing performed by the electrode is interleaved with respect to time with haptic actuation of the electrode.

Figure 15:
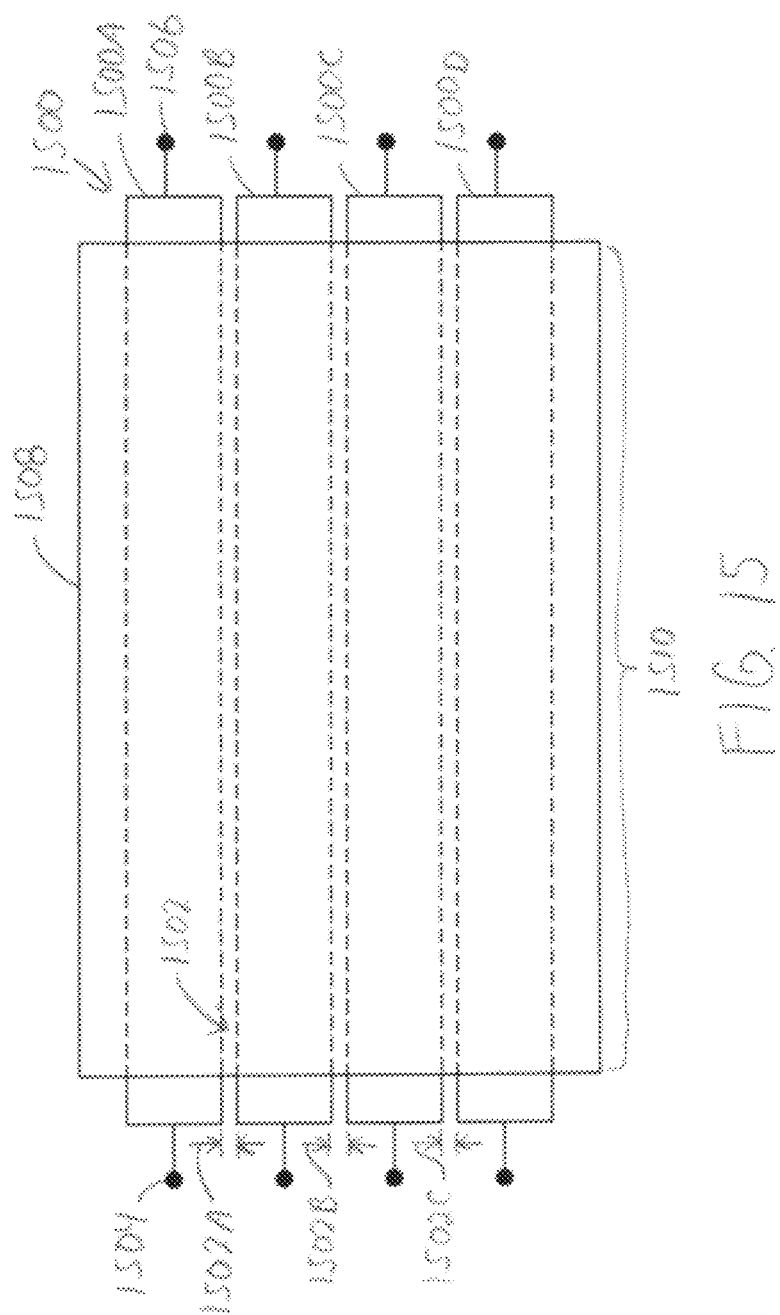
FIG. 15 illustrates one embodiment of electrodes used for time multiplexing to provide both haptic effect and sensing functionalities.

FIG. 15 illustrates one embodiment of electrodes 1500 (e.g., electrodes 1500A-D) used for time multiplexing to provide both haptic effect and sensing functionalities. The electrodes 1500 may be positioned on a screen or surface of the touch interface device 10, such as by placing the electrodes 1500 on or within a screen to provide the touch surface 12. In one embodiment, the electrodes 1500 are formed by patterning a single layer of ITO (or another material).

The single ITO layer (or other conductive layer) can be used for both haptic actuation and finger position sensing. The layer is patterned into parallel stripes (e.g., to form the electrodes 1500) separated by non-conducting separation gutters 1502 (e.g., gutters 1502A-C). In one embodiment, the electrodes 1500 may be 3/16 inches (or 4.8 mm) wide and the gutters 1502 may be 100 µm wide. Alternatively, another dimension may be used for the width of the electrodes 1500 and/or gutters 1502. The electrodes 1500 may be created by laser ablation of a conductive layer, such as a layer of ITO. Each stripe of electrode 1500 can be electrically accessible at each of opposite ends 1504, 1506. At least part of the electrodes 1500 may be covered with an insulating material layer 1508, such as $SiO_2$, $HfO_2$, or another material, over most of a touch sensitive area 1510 of the electrodes 1500 between the ends 1504, 1506 where the electrodes 1500 are to be touched. Given a typical conductivity of transparent ITO, the end-to-end resistance of each electrode stripe 1500 (e.g., between the ends 1504, 1506) can be on the order of 1000 ohms, depending on the thickness and conductivity of the electrode 1500, the length of the electrode 1500 between the ends 1504, 1506, the width of the electrodes 1500, and the like. Alternatively, each electrode 1500 may have another resistance.

Haptic actuation of the stripe electrodes 1500 may be performed by classifying or logically associating each electrode 1500 into one of two or more groups. For example, the electrodes 1500 can be classed into two types, A and B, with alternate electrodes 1500 being of each class, so the order of the electrodes 1500 is ABABAB. In the illustrated embodiment, the electrode 1500A may be in the A group or class, the electrode 1500B may be in the B group or class, the electrode 1500C may be in the A group or class, the electrode 1500D may be in the B group or class, and so on. Current is supplied to the electrodes 1500 for haptic actuation, as described above. The polarity of the voltage applied to the electrodes 1500 in the different groups or classes may be switched at a frequency. For example, the polarity of the voltage applied to the electrodes 1500 can be reversed every 50 µs (or another time period). During a switch from a first time period to a subsequent second time period, the electrodes 1500 in the A group or class may change from a positive voltage to a negative voltage and the electrodes 1500 in the B group or class may switch from a negative voltage to a positive voltage. During the subsequent switch from the second time period to a later third time period, the electrodes 1500 in the A group or class may switch from the negative voltage to the positive voltage while the electrodes in the B group or class switch from the positive voltage to the negative voltage. The voltage that is applied to the electrodes 1500 can be varied depending on the haptic effect desired. In one example, to create a temporal pattern at 50 Hz, the voltage applied to the electrodes 1500 can be 45 volts for 10,000 µs (while still alternating the polarity of the voltage every 50 µs) and then the voltage applied to the electrodes 1500 may decrease to 5 volts for 10000 µs (while also still alternating the polarity of the voltage every 50 µs). Alternatively, one or more other frequencies, voltages, and/or time periods may be used. This can create a 50 Hz repetition of low and high voltage, with the high voltage periods creating an enhanced friction as an haptic effect experience by one or appendages of the operator touching the insulating layer 1508. The greater voltage applied to the electrodes 1500 can cause a relatively strong electrostatic effect (thus, friction enhancement) while the smaller voltage applied to the electrodes 1500 may cause a lesser electrostatic effect (thus, smaller friction enhancement). The alternation of these voltages can create a relatively strong haptic perception of a 50 Hz vibration or texture. Even at the lower voltage level (e.g., 5 volts), each electrode 1500 may be charged alternately at 50 µs intervals.

Figure 16:
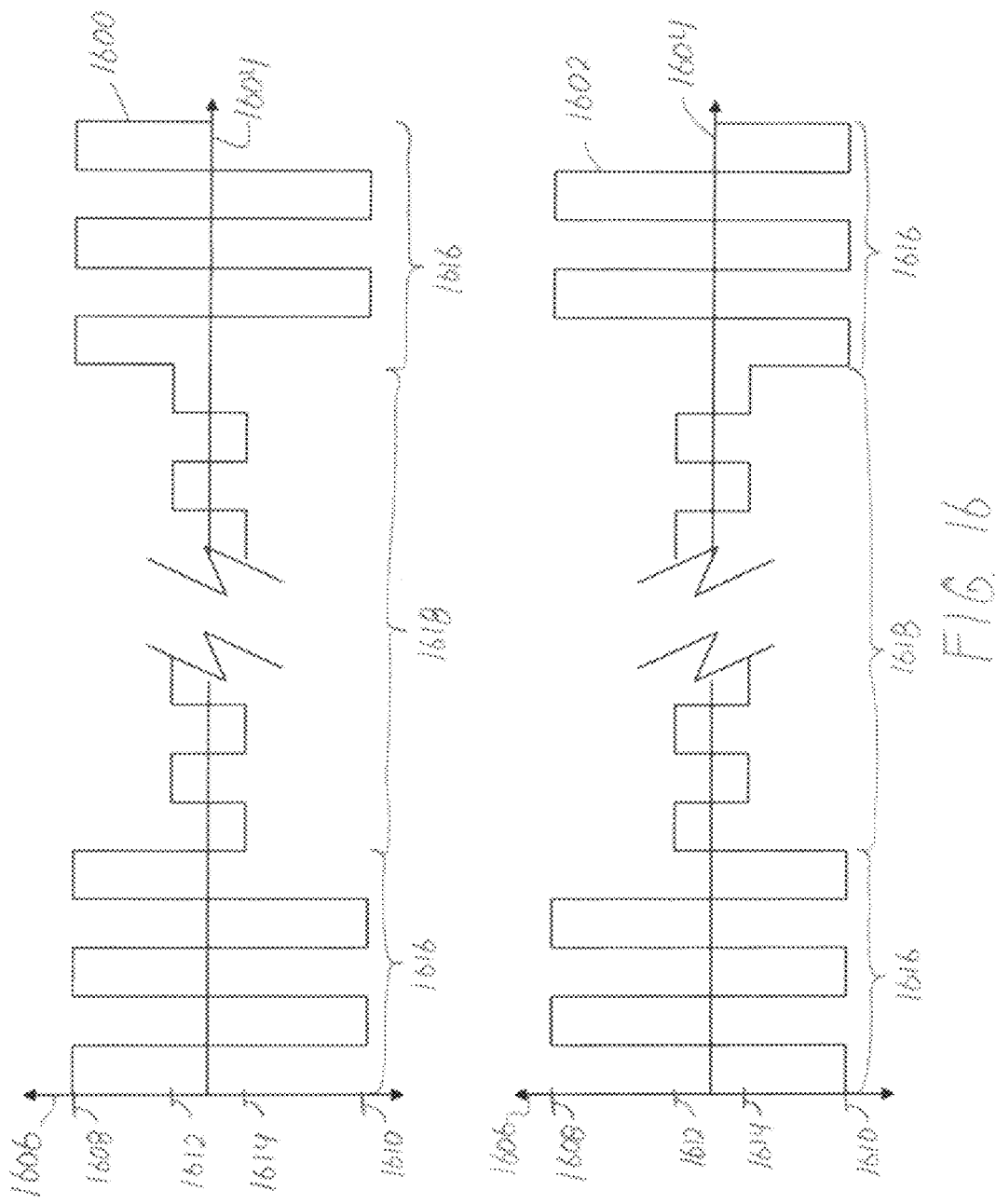
FIG. 16 illustrates voltage-time curves that represent voltages applied to the electrodes shown in FIG. 15 in accordance with one example.

FIG. 16 illustrates voltage-time curves 1600, 1602 that represent voltages applied to the electrodes 1500 (shown in FIG. 15) in accordance with one example. The curves 1600, 1602 are shown alongside horizontal axes 1604 representative of time and vertical axes 1606 representative of voltage applied to the electrodes 1500. The curve 1600 represents the voltages that are applied to the electrodes 1500 in the group or class A while the curve 1602 represents the voltages applied to the electrodes 1500 in another group or class B. As shown in FIG. 16, the curves 1600, 1602 vary over time between larger positive and negative voltages 1608, 1610 and between smaller positive and negative voltages 1612, 1614. For example, the curves 1600, 1602 may vary between larger positive voltages of +45 volts and larger negative voltages of −45 voltages during first time periods 1616 and vary between smaller positive voltages of +5 volts and smaller negative voltages of −5 volts during second time periods 1618. Alternatively, different voltages and/or waveforms of voltage may be used than what is shown in FIG. 16. As shown in FIG. 16, the curves 1600, 1602 vary such that the electrodes 1500 in the different groups or classes are activated with opposing voltages at the same times or over the same time periods.

The voltages applied to the electrodes 1500 can be used for sensing touch of the insulating layer 1508 (e.g., sensing position of the finger touching the touch surface 12), whether the voltage applied is the larger or smaller positive and/or negative voltages (e.g., +45 volts, −45 volts, +5 volts, and/or −5 volts). When the voltage applied to an electrode 1500 is reversed (e.g., when the appropriate curve 1600, 1602 changes from a positive voltage to a negative voltage, or vice-versa), the electrode 1500 can be simultaneously discharged from both ends 1504, 1506. For example, a control unit, such as the control unit 1412 shown in FIG. 14, may be conductively coupled with the ends 1504, 1506 of the electrodes 1500 to sense the voltage that is discharged from the electrodes 1500. If an appendage or part of an appendage of an operator is near an electrode 1500 (such as by touching the insulating layer 1508 above the electrode 1500), the appendage can form a capacitor with the electrode 1500, as described above. As the electrode 1500 is discharged from both ends 1504, 1506, more charge may flow through the end 1504 or 1506 that is closer to the appendage. By comparing the amount of charge that emerges from each end 1504, 1506, the control unit can interpolate the position of the appendage along the electrode 1500. This axis of appendage position may be referred to as the Y axis.

Figure 17:
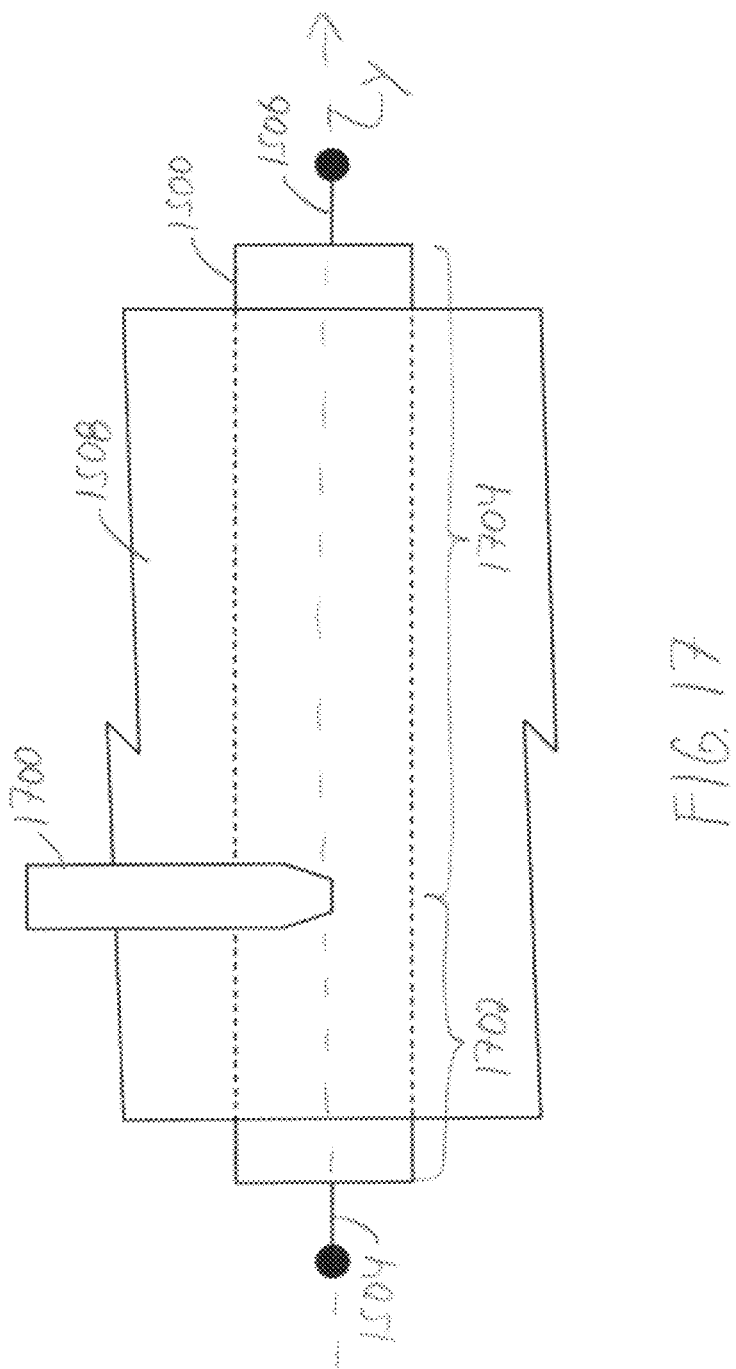
FIG. 17 illustrates one example of determining a position of an appendage engaging a touch surface shown in FIG. 15 above an electrode also shown in FIG. 15.

FIG. 17 illustrates one example of determining a position of an appendage 1700 engaging the insulating layer 1508 above an electrode 1500 along a Y axis. In the illustrated example, the appendage 1700 engages the insulating layer 1508 at a location that is approximately ⅓ of the length of the electrode 1500 (e.g., from the end 1504 to the opposite end 1506 of the electrode 1500) from the end 1504 and approximately ⅔ of the length of the electrode 1500 from the opposite end 1506. The appendage 1700 forms a capacitive coupling with the electrode 1500, as described above. A first portion of the charge in the electrode 1500 from application of the voltage to the electrode 1500 is discharged through the end 1504 while a second portion of the charge is discharged through the end 1506. The first portion of the charge flows through a first segment 1702 of the electrode 1500 that extends from the appendage 1700 to the end 1504. The second portion of the charge flows through a second segment 1704 of the electrode 1500 that extends from the appendage 1700 to the opposite end 1506. The first segment 1702 is shorter than the second segment 1704 and, as a result, the resistance of the first segment 1702 may be less than the resistance of the second segment 1704. Consequently, the first portion of the charge that is discharged through the first segment 1702 may be greater than the second portion of the charge that is discharged through the second segment 1704. The first and second portions of the charge may be compared in order to identify where along the length of the electrode 1500 (e.g., along the Y axis) that the appendage 1700 is located.

The sum total amount of charge that emerges from both ends 1504, 1506 of the electrode 1500 can be indicative of the amount of contact of the appendage on the electrode 1500, irrespective of the position of the appendage along Y. For example, the surface area of the interface between the appendage and the insulating layer 1508 above the electrode 1500 may be indicated by the sum total of the charge that emerges from both ends 1504, 1506. The total charge emerging from both ends 1504, 1506 of several of the electrodes 1500 can be compared to spatially localize one or more appendages. Each appendage covers or partially covers one or more of the electrodes 1500 and the charge emerging from these electrodes 1500 may be used to form a histogram or other discrete representation of a curve such as a bell curve. The position of the appendage may be identified as being at the centroid of the histogram, representation, curve, or the like. Locating the appendage or appendages in this way perpendicular to the direction of elongation of the electrodes 1500 may be referred to as localizing the appendage or appendages along an X axis.

Figure 18:
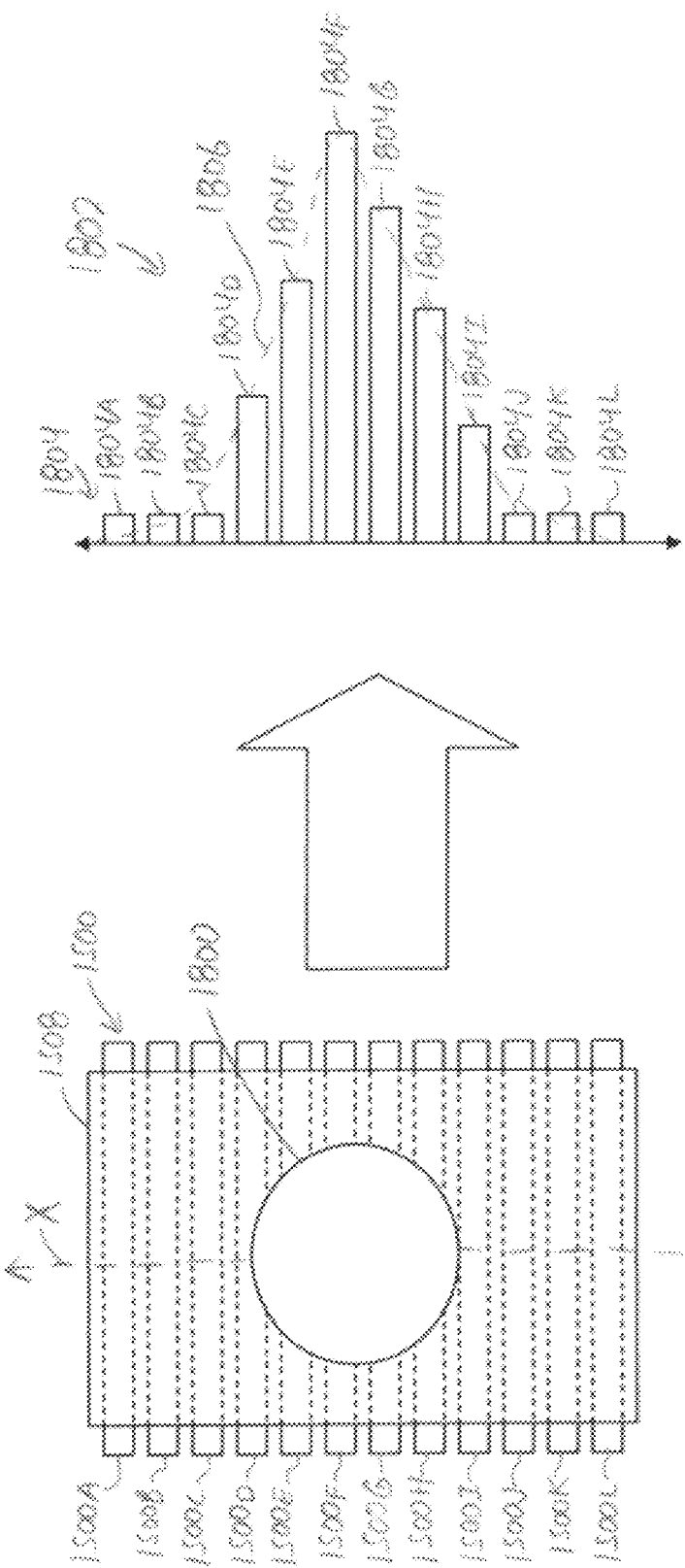
FIG. 18 illustrates an appendage of an operator engaging the touch surface shown in FIG. 15 above several electrodes in a group of electrodes shown in FIG. 15 and an accompanying histogram representative of electric charge sensed from the electrodes.

FIG. 18 illustrates an appendage 1800 of an operator engaging the insulating layer 1508 above several electrodes in a group of electrodes 1500 and an accompanying histogram 1802 representative of electric charge sensed from the electrodes 1500. The electrodes 1500 shown in FIG. 18 include the electrodes 1500A-L. The histogram 1802 includes several measurements 1804 (e.g., 1804A-L) that represent the charge discharged from both ends 1504, 1506 of the corresponding electrode 1500 (e.g., the measurement 1804B corresponds to the total charge from the electrode 1500B, the measurement 1804G represents the total charge from the electrode 1500G, and so on).

As shown in FIG. 18, the appendage 1800 is disposed above the electrodes 1500D-I and not above the electrodes 1500A-C and 1500J-L. Additionally, the surface area of the interface between the appendage 1800 and the insulating layer 1508 above the electrodes 1500D-I (e.g., as represented by the circle associated with the reference number 1800) varies among the electrodes 1500D-I. For example, the amount of overlap between this surface area of interface and the electrode 1500F is the largest of the electrodes 1500D-I, the amount of overlap associated with the electrodes 1500E and 1500G is smaller, and so on. As a result, the total charge discharged from the electrodes 1500 may vary. As shown in the histogram 1802, the distribution of charge from the electrodes 1500D-I may form a curve or approximate curve that can be used to approximately identify the location of the appendage 1800 in the X direction, or in a direction that is transverse to the direction of elongation of the electrodes 1500. The charge from each electrode 1500D-I may correspond to the amount of overlap between the appendage 1800 and the electrode 1500 and may be represented by the measurements 1804. For example, the measurements 1804D-I showing larger charge may be indicative of a larger surface area of interface between the appendage 1800 and the insulating layer 1508 while the measurements 1804A-C and 1804J-L showing smaller charge may be indicative of a smaller or no interface between the appendage 1800 and the insulating layer 1508.

The electrodes 1500 described above may be actuated either collectively or individually depending on how the electronics that couples the electrodes 1500, the control unit, and the power source(s) are arranged. In one embodiment, the electrodes 1500 of the A group or class can all be charged to a first polarity while the electrodes 1500 of the B group or class are all charged to an opposite second polarity. The electrodes 1500 may all be charged irrespective of whether the appendage 1800 was on or near the electrodes 1500 or not. In one embodiment, the electrodes 1500 can be charged via diodes, such as switching diodes, which can make it possible to charge all of the electrodes 1500 or a group of electrodes 1500 at once while choosing only a single electrode 1500, or a subset of electrodes 1500 from the group, to discharge. While actuation is described as being performed at a level of 5 volts or 45 volts depending on the sensation desired, and other voltages could also be used.

The measurements of touch by the appendage 1800 described above (e.g., in the "Y direction" along the direction of elongation of the electrodes and in the "X direction" along a lateral direction across the direction of elongation of the electrodes) may be interleaved in time with actuation of the electrodes to generate haptic effects. In one embodiment, only the positively charged electrodes were discharged from both ends 1504, 1506, as described above, to measure the position of the appendage. This measurement may be performed by measuring only one electrode at a time every 50 μs. Since the electrodes alternate in polarity, the other electrode can be positively charge and be measured 50 μs later, or at another time. If the electrodes alternate in polarity relatively rapidly, measurements of touch by the appendage can be performed by sweeping through the electrodes measuring just one electrode every 50 μs, even though all or a greater number of electrodes can be actuated every period (e.g., every 50 μs or other time period). In one embodiment, there can be 44 electrodes on a touch surface such that all of the electrodes can be measured for touch over a total time period of 2.2 ms. Alternatively, a greater number of electrodes may be measured at a time and/or the measurement may occur at another rate or frequency. Additionally or alternatively, a different number of electrodes may be provided.

The embodiments described above are only examples of the inventive subject matter, and it will be evident that the principles described above can be extended in many ways. It may be desirable, but not essential, that the electrodes have alternating polarity spatially (e.g., neighboring electrodes have opposite polarity at a given time), as this can keep the body of the operator at a middle potential and can remove or reduce the need or effect of grounding. All or substantially all of the electrodes may be actuated at the same time, even when an appendage is known not to be present on some of the electrodes, or the electrodes can be selectively actuated only when the appendage of an operator is present in order to reduce power consumption. The electrodes disposed under several appendages of the operator can be actuated differently from one another to deliver different sensation to the different appendages. The frequency at which the electrodes are supplied with current for sensing touch can be based on whether one or more appendages are spatially proximate to the electrodes (e.g., within a designated distance). For example, electrodes can be charged for sensing less frequently when the electrodes are not near appendages to save power. The electrodes can be charged to variable voltage to achieve varying effects, and not just the 5 volts and 45 volts embodiment described above. The frequency of alternation between supplying the different volts can be any of a variety of frequencies, not just every 50 μs described above. Alternation can be desirable as such alternating of the frequency at which the different voltages are supplied to the electrodes can prevent or reduce diminution of electrostatic attraction due to accumulation of surface charge.

The determination of one axis of the position of an appendage above an electrode (e.g., along the Y direction) by use of the resistance of a stripe is but one variation. For instance, each electrode may be broken or separated into two or more segments so that the capacitance of each segment can be measured and used to interpolate the Y position of the appendage. Such segments may be triangles or other shapes, such as diamond or other shapes that form a grid, such as a diamond grid.

Figure 19:
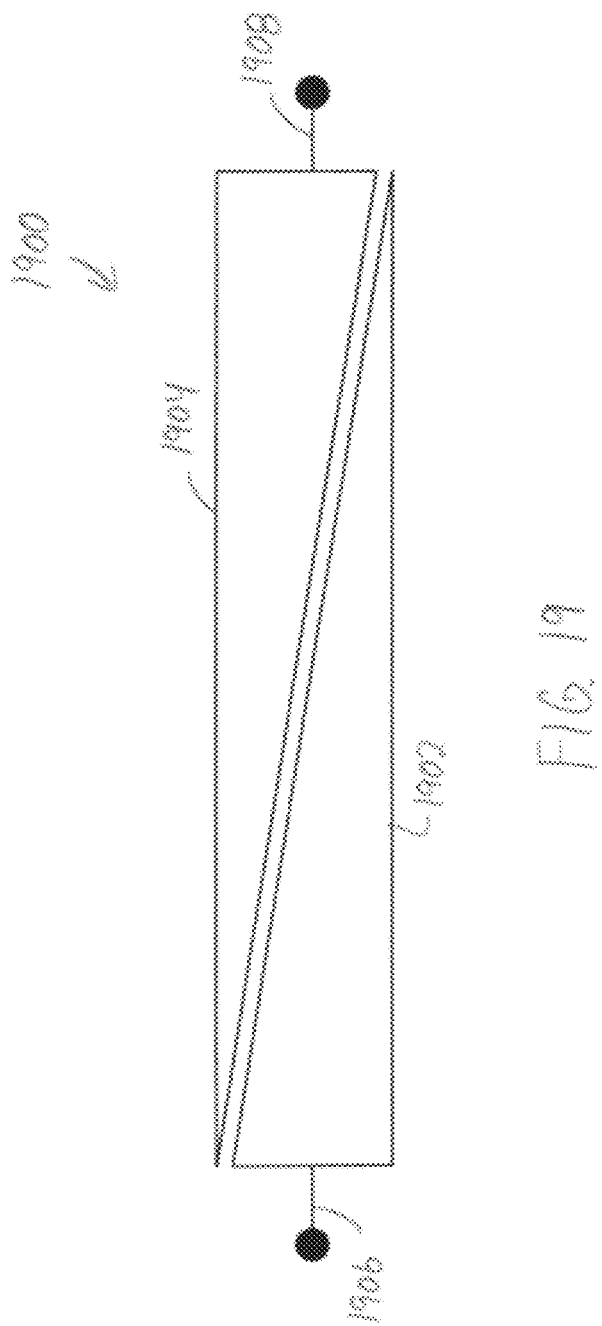
FIG. 19 illustrates a schematic diagram of a segmented electrode in accordance with one embodiment.

FIG. 19 illustrates a schematic diagram of a segmented electrode 1900 in accordance with one embodiment. In contrast to the electrodes 1500, the electrode 1900 is divided into separate segments 1902, 1904. The illustrated electrode 1900 is divided into elongated triangles that form the segments 1902, 1904, but alternatively may be separated into one or more other shapes. The capacitance of each segment 1902, 1904 may be measured in order to sense the touch of an operator along the length of the electrode 1900, similar to as described above in connection with the electrode 1500. One difference may be that, instead of measuring the capacitance from both ends of each segment 1902, 1904 (as is done at the ends 1504, 1506 of the electrode 1500), the capacitance may be measured at only a single end 1906, 1908 of the segments 1902, 1904. As the appendage is farther from one end 1906 or 1908 and closer to the other end 1908 or 1906, the amount of capacitance measured from each segment 1902, 1904 may differ. For example, the capacitance measured from the end 1906 of the segment 1902 may increase when the appendage touches closer to the end 1906 and farther from the end 1908 of the other segment 1904 while the capacitance measured from the end 1908 of the segment 1904 decreases. Conversely, the capacitance measured from the end 1908 of the segment 1904 may increase when the appendage touches closer to the end 1908 and farther from the end 1906 of the other segment 1902 while the capacitance measured from the end 1906 of the segment 1902 decreases.

As described above, the measurement of where the appendage touches above an electrode may be performed at the transition as the electrode is changed in polarity from a positive polarity to a negative polarity, taking only a few microseconds to perform. Measurements can also be done on the opposite transition, from negative polarity to positive polarity and/or can be performed on both transitions. The measurement can be done faster (e.g., less than a microsecond) or slower, forming a distinct pause between one polarity for the electrode and the other. The measurement can be done and then the electrode returned to a previous or original potential, rather than occurring at a transition between polarities. One electrode may be measured at a time, just one end of one electrode can be measured at a time, both ends of the electrode can be measured at once (as described above), many electrodes can be measured at once, and/or all of the electrodes can be measured at one time. One or more, or all, of these variations can be applied to other electrode patterns as well, for instance the segmented electrode described above. In the case of segmented electrodes having a grid of segments, the grid segments (e.g. diamonds) can be accessed in a multiplexed way by addressing the x and y coordinates of the segments, or the segments can be electrically addressed individually.

ITO regions (e.g. the electrodes) for actuation and for sensing need not be electrically connected; for instance the regions for actuation and for sensing may alternate spatially or one be inside another, or may be on different layers.

Figure 20:
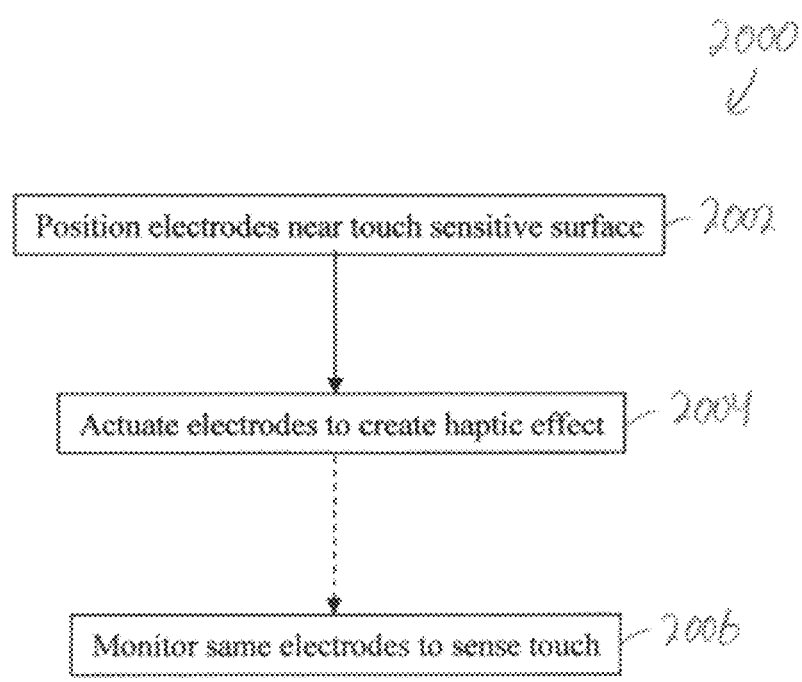
FIG. 20 is a flowchart of one embodiment of a method for generating haptic effects to one or more appendages that engage a touch surface of a touch interface device.

FIG. 20 is a flowchart of one embodiment of a method 2000 for generating haptic effects to one or more appendages that engage a touch surface of a touch interface device. The method 2000 may be used in conjunction with one or more embodiments of the device 10 described above. At 2002, one or more electrodes are positioned on, near, or within the touch surface. For example, one or more conductive electrodes can be disposed below the touch surface (e.g., on a side of the surface that is opposite of the side that is touched by an operator), within the touch surface (e.g., within the thickness of a screen), or on the touch surface (e.g., on the same side of the surface that an operator acts to touch). When the electrodes are on the touch surface, the electrodes may be disposed beneath an insulating layer, as described above.

At 2004, the one or more electrodes are actuated to generate a haptic effect. For example, a voltage can be applied to the electrodes so that the electrodes generate an electrostatic force on one or more appendages of an operator that are engaged with the touch surface of the device. The voltage can be modulated, such as by switching the polarity of the voltage supplied to the electrodes, as described above.

In one embodiment, the method 2000 also may include 2006, where one or more of the electrodes are monitored to sense touch of the touch surface (e.g., the surface itself when the electrodes are below or within the surface or the insulating layer on the electrodes when the electrodes are on the surface). As described above, the same electrodes can be used to both generate haptic effects that are perceived by the operator of the device and to sense touch of the device. The electric energy (e.g., voltage) that is supplied to the electrodes for generating haptic effects and the electric energy that is supplied to the electrodes for sensing touch may be provided at the same time or at different times. For example, the voltage supplied for haptic actuation and the voltage supplied for sensing touch can be provided at the same time but at different frequencies to the electrodes. Alternatively, the voltage supplied for haptic actuation and the voltage supplied for sensing touch can be provided at different times, also as described above.

In another embodiment, a touch interface device includes a touch surface, a first electrode, and a second electrode. The first electrode is coupled with the touch surface and is configured to receive a first haptic actuation electric potential. The second electrode is coupled with the touch surface and is configured to receive a different, second haptic actuation electric potential having an opposite polarity than the first haptic actuation potential. The first and second electrodes generate an electrostatic force that is imparted on one or more appendages of an operator that touches the touch surface above both the first electrode and the second electrode in order to generate a haptic effect.

In one aspect, the device also includes a control unit that configured to modulate the polarities of the first haptic actuation electric potential and the second haptic actuation electric potential at a frequency of at least 500 hertz. The polarities may be modulated by switching the polarities between positive and negative values.

In one aspect, the first electrode lies across the second electrode without being conductively coupled with the second electrode at a first intersection and the first and second electrodes are configured to generate the electrostatic force on the one or more appendages that engage the touch surface above the first intersection of the first and second electrodes. By "above," it is meant that the appendage(s) engage a first side of the touch surface while the electrodes are disposed on an opposite, second side of the touch surface, regardless of which side of the touch surface is above the other with respect to gravity.

In one aspect, the electrostatic force that is generated by the first and second electrodes at the first intersection is greater than other electrostatic forces generated by the first electrode or the second electrode in one or more locations separated from the first intersection.

In one aspect, the device also includes a third electrode and a fourth electrode that are coupled with the touch surface and that are configured to receive third and fourth haptic actuation electric potentials having opposite polarities, respectively. The third electrode extends across the fourth electrode at a second intersection without the third electrode being conductively coupled with the fourth electrode.

In one aspect, the first and second electrodes are configured to generate the electrostatic force on a first appendage of the operator when the first appendage engages the touch surface above the first intersection of the first and second electrodes. The third and fourth electrodes are configured to generate another, different electrostatic force on a different, second appendage of the operator when the second appendage concurrently engages the touch surface above the second intersection of the third and fourth electrodes.

In one aspect, at least one of the first electrode or the second electrode is configured to also receive a sensing electric current in order to sense touch of the touch surface by the one or more appendages of the operator.

In one aspect, the at least one of the first electrode or the second electrode is configured to concurrently receive (a) the sensing electric current and (b) the first haptic actuation electric potential or the second haptic actuation electric potential, respectively, to generate the electrostatic force and concurrently sense the touch of the touch surface by the one or more appendages.

In one aspect, the at least one of the first electrode or the second electrode is configured to receive the first haptic actuation electric potential or the second haptic actuation electric potential, respectively at a first frequency and the sensing electric current at a different, second frequency to concurrently generate the electrostatic force and sense the touch of the touch surface by the one or more appendages.

In one aspect, the at least one of the first electrode or the second electrode is configured to receive (a) the sensing electric current and (b) the first haptic actuation electric potential or the second haptic actuation electric potential, respectively, during different time periods.

In one aspect, the at least one of the first electrode or the second electrode is elongated between opposite ends along a first direction. The device can also include a control unit configured to determine where the touch of the touch surface by the one or more appendages of the operator occurs along the first direction of the at least one of the first electrode or the second electrode by monitoring electric charge that is discharged from one or more of the opposite ends of the at least one of the first electrode or the second electrode.

In one aspect, the control unit is configured to monitor the electric charge discharged from each of the opposite ends of the at least one of the first electrode or the second electrode and to compare the electric charges to determine where the touch of the touch surface by the one or more appendages occurs along the first direction of the at least one of the first electrode or the second electrode.

In one aspect, the control unit is configured to monitor the electric charges discharged from at least one of the ends of both the first electrode and the second electrode and to compare the electric charges to determine where the touch of the touch surface by the one or more appendages occurs along a different, second direction.

In one aspect, the first and second electrodes are configured to impart the electrostatic force on the one or more appendages when the touch surface is moving in one or more directions relative to the one or more appendages.

In one aspect, a combination of the electrostatic force and movement of the touch surface generates the haptic effect. This movement may be a non-vibratory movement. For example, this movement may be one or more of the movements described in the '695 Application that is incorporated by reference above. The electrostatic force and the movement may create the haptic effect on the one or appendages. This haptic effect may not be perceived by the operator (e.g., may be too small to feel or may no longer exist) if the movement of the touch surface stops.

In one aspect, the first electrode and the second electrode are elongated conductive bodies oriented along parallel directions.

In one aspect, the first electrode and the second electrode are sufficiently small such that a finger of the operator that engages the touch surface above the first electrode also is disposed above at least a portion of both the second electrode.

In another embodiment, another touch interface device includes a touch surface and elongated electrodes coupled to the touch surface. The electrodes include a first electrode oriented along a first direction and a second electrode oriented along a different, second direction. The first electrode extends over the second electrode at a first intersection. The first and second electrodes are configured to receive haptic actuation electric potentials of opposite polarities to generate an electrostatic force that is imparted on the one or more appendages of the operator that touch the touch surface above the first intersection.

In one aspect, the device also includes a control unit configured to modulate the polarities of the haptic actuation electric potentials.

In one aspect, the electrodes include a third electrode and a fourth electrode with the third electrode extending across the fourth electrode at a second intersection. The first and second electrodes are configured to generate a first electrostatic force on a first appendage of the operator that engages the touch surface above the first intersection. The third and fourth electrodes are configured to generate different, second electrostatic force on a different, second appendage of the operator that concurrently engages the touch surface above the second intersection.

In one aspect, at least one of the electrodes is configured to also receive a sensing electric current in order to sense touch of the touch surface by the one or more appendages.

In one aspect, the at least one of the electrodes is configured to concurrently receive the haptic actuation electric potential and the sensing electric current to both generate the electrostatic force and sense the touch of the touch surface by the one or more appendages.

In one aspect, the at least one of the electrodes is configured to receive the haptic actuation electric potential at a first frequency and the sensing electric current at a different, second frequency to simultaneously generate the electrostatic force and sense the touch of the touch surface by the one or more appendages.

In one aspect, the at least one of the electrodes is configured to receive the haptic actuation electric potential and the sensing electric current during different time periods.

In one aspect, the electrodes are elongated between opposite ends, and the device can also include a control unit configured to determine where touch of the touch surface occurs along at least one of the electrodes by the one or more appendages by monitoring electric charge that is discharged from one or more of the ends of the at least one of the electrodes.

In one aspect, the control unit is configured to monitor the electric charge discharged from each of the opposite ends of the at least one of the electrodes and to compare the electric charges to determine where the touch of the touch surface by the one or more appendages occurs along the at least one of the electrodes.

In one aspect, at least a subset of the electrodes are oriented parallel to each other and the device also includes a control unit configured to determine where touch of the touch surface by the one or more appendages occurs laterally across the subset of the electrodes that are parallel to each other by comparing the electric charges that are discharged from two or more of the electrodes in the subset.

In another embodiment, a method (e.g., for generating haptic effects on a touch surface of a touch interface device) includes applying a first haptic actuation electric potential having a first polarity to a first electrode coupled with a touch surface of a touch interface device. The method also includes applying a second haptic actuation electric potential having a second polarity to a second electrode that is coupled with the touch surface. The second polarity of the second haptic actuation potential is opposite of the first polarity of the first haptic actuation potential. The first and second haptic actuation potentials generate an electrostatic force that is imparted on one or more appendages of an operator that touch the touch surface above the first and second electrodes.

In one aspect, the method also includes modulating the first and second polarities of the first and second haptic actuation electric potentials.

In one aspect, the first electrode lies across the second electrode without being conductively coupled with the second electrode at a first intersection. The first and second haptic actuation potentials generate the electrostatic force on the one or more appendages that engage the touch surface above the first intersection of the first and second electrodes.

In one aspect, the electrostatic force that is generated by the first and second haptic actuation potentials at the first intersection is greater than other electrostatic forces generated by the first electrode or the second electrode in one or more locations separated from the first intersection.

In one aspect, the method also includes applying a third haptic actuation potential to a third electrode that is coupled to the touch surface and applying a fourth haptic actuation potential to a fourth electrode that is coupled to the touch surface. The third and fourth haptic actuation potentials have opposite polarities. The first electrode extends across the second electrode at a first intersection without being conductively coupled with the second electrode and the third electrode extends across the fourth electrode at a second intersection without the third electrode being conductively coupled with the fourth electrode.

In one aspect, the first and second haptic actuation potentials that are applied to the first and second electrodes generate a first electrostatic force on a first appendage of the operator that touches the touch surface above the first intersection. The third and fourth haptic actuation potentials that are applied to the third and fourth electrodes generate a different, second electrostatic force on a different, second appendage of the operator when the second appendage concurrently engages the touch surface above the second intersection.

In one aspect, the method also includes applying a sensing electric current to the first electrode in order to sense touch of the touch surface by the one or more appendages.

In one aspect, applying the first haptic actuation electric potential occurs at a first frequency and applying the sensing electric current to the first electrode occurs at a different, second frequency to concurrently generate the electrostatic force and sense the touch of the touch surface by the one or more appendages using the first electrode.

In one aspect, applying the first haptic actuation electric potential and applying the sensing electric current occur during different time periods.

In one aspect, the at least one of the first electrode or the second electrode is elongated between opposite ends along a first direction. The method can also include determining where the touch of the touch surface by the one or more appendages of the operator occurs along the at least one of the first electrode or the second electrode by monitoring electric charge that is discharged from one or more of the opposite ends of the at least one of the first electrode or the second electrode.

In one aspect, the method also includes monitoring the electric charge discharged from each of the opposite ends of the at least one of the first electrode or the second electrode and comparing the electric charges to determine where the touch of the touch surface by the one or more appendages occurs along the at least one of the first electrode or the second electrode.

In one aspect, the method also includes monitoring the electric charges discharged from at least one of the ends of both the first electrode and the second electrode and comparing the electric charges to determine where the touch of the touch surface by the one or more appendages occurs along a different, second direction.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter described herein without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable any person of ordinary skill in the art to practice the embodiments disclosed herein, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the disclosed subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the subject matter herein involved, it is intended that all of the subject matter of the above description or shown in the accompanying drawings shall be interpreted merely as examples illustrating the inventive concepts herein and shall not be construed as limiting the disclosed subject matter.

What is claimed is:

1. A touch interface device comprising:
a touch surface;
a first electrode coupled with the touch surface, the first electrode also configured to receive a first actuation electric potential; and
a second electrode coupled with the touch surface and configured to receive a second actuation electric potential different from the first actuation electric potential
wherein when an appendage of an operator touches the touch surface above both the first electrode and the second electrode the first and second actuation electric potentials establish electric fields that pass from one of the first and second electrodes directly through the outermost layer of the appendage and return to the other of the first and second electrodes via the outermost layer of the appendage,
wherein electric fields that penetrate the outermost layer of the appendage are small enough that they do not create direct electric sensory stimulation, and
wherein the electric fields acting on the outermost layer of the appendage generate electrostatic attractive forces that are imparted directly on the appendage and increase friction between the touch surface and the appendage through which the electric fields pass.

2. The device of claim 1, further comprising a control unit configured to modulate the polarities of the first actuation electric potential and the second actuation electric potential with respect to a ground potential at a frequency of at least 500 hertz.

3. The device of claim 1, wherein the first electrode lies across the second electrode without being conductively coupled with the second electrode at a first intersection, and the first and second electrodes are configured to generate the electrostatic attractive forces on the appendage that touches the touch surface above the first intersection of the first and second electrodes.

4. The device of claim 3, wherein the electrostatic attractive forces that are generated by the first and second electrodes at the first intersection are greater than other electrostatic forces generated by the first electrode or the second electrode in one or more locations separated from the first intersection.

5. The device of claim 3, further comprising a third electrode and a fourth electrode coupled with the touch surface and configured to receive third and fourth actuation electric potentials in which the third potential is different from the fourth potential, wherein the third electrode extends across the fourth electrode at a second intersection without the third electrode being conductively coupled with the fourth electrode.

6. The device of claim 5, wherein the first and second electrodes are configured to generate the electrostatic attractive forces on a first appendage of the operator when the first appendage touches the touch surface above the first intersection of the first and second electrodes, and wherein the third and fourth electrodes are configured to generate other, different electrostatic attractive forces on a different, second appendage of the operator when the second appendage concurrently engages the touch surface above the second intersection of the third and fourth electrodes.

7. The device of claim 1, wherein at least one of the first electrode or the second electrode is configured to also receive a sensing electric current in order to sense touch of the touch surface by the appendage of the operator.

8. The device of claim 7, wherein the at least one of the first electrode or the second electrode is configured to concurrently receive (a) the sensing electric current and (b) the first actuation electric potential or the second actuation electric potential, respectively, to generate the electrostatic attractive forces and concurrently sense the touch of the touch surface by the appendage.

9. The device of claim 8, wherein the at least one of the first electrode or the second electrode is configured to receive the first actuation electric potential or the second actuation electric potential, respectively at a first frequency and the sensing electric current at a different, second frequency to concurrently generate the electrostatic attractive forces and sense the touch of the touch surface by the appendage.

10. The device of claim 7, wherein the at least one of the first electrode or the second electrode is configured to receive (a) the sensing electric current and (b) the first actuation electric potential or the second electric potential, respectively, during different time periods.

11. The device of claim 7, wherein the at least one of the first electrode or the second electrode is elongated between opposite ends along a first direction, and further comprising a control unit configured to determine where the touch of the touch surface by the appendage of the operator occurs along the first direction of the at least one of the first electrode or the second electrode by monitoring electric charge that is discharged from one or more of the opposite ends of the at least one of the first electrode or the second electrode.

12. The device of claim 11, wherein the control unit is configured to monitor the electric charge discharged from each of the opposite ends of the at least one of the first electrode or the second electrode and to compare the electric charges to determine where the touch of the touch surf ace by the appendage occurs along the first direction of the at least one of the first electrode or the second electrode.

13. The device of claim 11, wherein the control unit is configured to monitor the electric charges discharged from at least one of the ends of both the first electrode and the second electrode and to compare the electric charges to determine where the touch of the touch surf ace by the appendage occurs along a different, second direction.

14. The device of claim 1, wherein the first and second electrodes are configured to impart the electrostatic attractive forces on the appendage when the touch surface is moving in one or more directions relative to the appendage.

15. The device of claim 14, wherein a combination of the electrostatic attractive forces and movement of the touch surface generates a haptic effect.

16. The device of claim 1, wherein the first electrode and the second electrode are elongated conductive bodies oriented along parallel directions.

17. The device of claim 1, wherein the first electrode and the second electrode are sufficiently small such that when the appendage is a finger of the operator that touches the touch surface above the first electrode, the finger also is disposed above at least a portion of the second electrode.

18. A touch interface device comprising:
a touch surface; and elongated electrodes coupled with the touch surf ace and configured to be disposed beneath an insulating layer, the electrodes including a first electrode oriented along a first direction and a second electrode oriented along a different, second direction, the first electrode extending over the second electrode at a first intersection,
wherein the first and second electrodes are configured to receive actuation electric potentials that are different from one another, and
wherein when an appendage of an operator touches the touch surface above the first intersection the actuation electric potentials establish electric fields that pass from one of the first and second electrodes directly through the outermost layer of the appendage and return to the other of the first and second electrodes via the outermost layer of the appendage,
wherein electric fields that penetrate the outermost layer of the appendage are small enough that they do not create direct electric sensory stimulation, and
wherein the electric fields acting on the outermost layer of the appendage generate electrostatic attractive forces that are imparted directly on the appendage and increase friction between the touch surface and the appendage through which the electric fields pass.

19. The device of claim 18, further comprising a control unit configured to modulate the polarities of the actuation electric potentials with respect to a ground potential.

20. The device of claim 19, wherein at least one of the electrodes is configured to also receive a sensing electric current in order to sense touch of the touch surface by the appendage.

21. The device of claim 20, wherein the at least one of the electrodes is configured to concurrently receive the actuation electric potential and the sensing electric current to both generate the electrostatic attractive forces and sense the touch of the touch surface by the appendage.

22. The device of claim 21, wherein the at least one of the electrodes is configured to receive the actuation electric potential at a first frequency and the sensing electric current at a different, second frequency to simultaneously generate the electrostatic attractive forces and sense the touch of the touch surface by the appendage.

23. The device of claim 20, wherein the at least one of the electrodes is configured to receive the actuation electric potential and the sensing electric current during different time periods.

24. The device of claim 18, wherein the elongated electrodes include a third electrode and a fourth electrode with the third electrode extending across the fourth electrode at a second intersection, and wherein the first and second electrodes are configured to generate first electrostatic attractive forces on a first appendage of the operator that engages the touch surf ace above the first intersection, and wherein the third and fourth electrodes are configured to generate different, second electrostatic attractive forces on a different, second appendage of the operator that concurrently engages the touch surface above the second intersection.

25. The device of claim 18, wherein the electrodes are elongated between opposite ends, and further comprising a control unit configured to determine where touch of the touch surface occurs along at least one of the electrodes by the appendage by monitoring electric charge that is discharged from one or more of the ends of the at least one of the electrodes.

26. The device of claim 25, wherein the control unit is configured to monitor the electric charge discharged from each of the opposite ends of the at least one of the electrodes and to compare the electric charges to determine where the touch of the touch surf ace by the appendage occurs along the at least one of the electrodes.

27. The device of claim 18, wherein at least a subset of the electrodes are oriented parallel to each other, and further comprising a control unit configured to determine where touch of the touch surface by the appendage occurs laterally across the subset of the electrodes that are parallel to each other by comparing the electric charges that are discharged from two or more of the electrodes in the subset.

28. A method comprising:
applying a first actuation electric potential having a first polarity to a first electrode coupled with a touch surface of a touch interface device; and applying a second actuation electric potential having a second polarity to a second electrode that is coupled with the touch surface, the second polarity of the second actuation potential being opposite of the first polarity of the first actuation potential with respect to a ground potential, wherein when an appendage of an operator touches the touch surface above the first intersection the actuation electric potentials establish electric fields that pass from one of the first and second electrodes directly through the outermost layer of the appendage and return to the other of the first and second electrodes via the outermost layer of the appendage, wherein electric fields that penetrate the outermost layer of the appendage are small enough that they do not create direct electric sensory stimulation, and wherein the electric fields acting on the outermost layer of the appendage generate electrostatic attractive forces that are imparted directly on the appendage and increase friction between the touch surface and the appendage through which the electric fields pass.

29. The method of claim 28, further comprising modulating the polarities of the first and second actuation electric potentials with respect to a ground potential.

30. The method of claim 28, wherein the first electrode lies across the second electrode without being conductively coupled with the second electrode at a first intersection, and the first and second actuation potentials generate the electrostatic attractive forces on the appendage that touch the touch surface above the first intersection of the first and second electrodes.

31. The method of claim 30, wherein the electrostatic attractive forces that are generated by the first and second actuation potentials at the first intersection are greater than other electrostatic forces generated by the first electrode or the second electrode in one or more locations separated from the first intersection.

32. The method of claim 28, further comprising:

applying a third actuation potential to a third electrode that is coupled to the touch surface; and applying a fourth actuation potential to a fourth electrode that is coupled to the touch surface, the third and fourth actuation potentials being different from one another, wherein the first electrode extends across the second electrode at a first intersection beneath the touch surface without being conductively coupled with the second electrode and the third electrode extends across the fourth electrode at a second intersection beneath the touch surface without the third electrode being conductively coupled with the fourth electrode.

33. The method of claim 32, wherein the first and second actuation potentials that are applied to the first and second electrodes generate first electrostatic attractive forces on a first appendage of the operator that touches the touch surface above the first intersection, and wherein the third and fourth actuation potentials that are applied to the third and fourth electrodes generate different, second attractive forces on a different, second appendage of the one or more appendages of the operator when the second appendage concurrently touches the touch surface above the second intersection.

34. The method of claim 33, wherein applying the first actuation electric potential and applying the sensing electric current occur during different time periods.

35. The method of claim 33, wherein the at least one of the first electrode or the second electrode is elongated between opposite ends along a first direction, and further comprising determining where the touch of the touch surface by the appendage of the operator occurs along the at least one of the first electrode or the second electrode by monitoring electric charge that is discharged from one or more of the opposite ends of the at least one of the first electrode or the second electrode.

36. The method of claim 35, further comprising monitoring the electric charge discharged from each of the opposite ends of the at least one of the first electrode or the second electrode and comparing the electric charges to determine where the touch of the touch surface by the appendage occurs along the at least one of the first electrode or the second electrode.

37. The method of claim 35, further comprising monitoring the electric charges discharged from at least one of the ends of both the first electrode and the second electrode and comparing the electric charges to determine where the touch of the touch surface by the appendage occurs along a different, second direction.

38. The method of claim 28, further comprising applying a sensing electric current to the first electrode in order to sense touch of the touch surface by the appendage.

39. The method of claim 38, wherein applying the first actuation electric potential occurs at a first frequency and applying the sensing electric current to the first electrode occurs at a different, second frequency to concurrently generate the electrostatic attractive forces and sense the touch of the touch surface by the appendage using the first electrode.

* * * * *